(12) United States Patent
Matsuzawa et al.

(10) Patent No.: US 8,792,018 B2
(45) Date of Patent: Jul. 29, 2014

(54) IMAGE CAPTURING APPARATUS, IMAGE CAPTURING METHOD, AND COMPUTER-READABLE RECORDING MEDIUM

(75) Inventors: Yoshinori Matsuzawa, Hachioji (JP); Manabu Ichikawa, Hachioji (JP); Toshio Takahashi, Hachioji (JP); Hiroshi Kodama, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 294 days.

(21) Appl. No.: 13/332,766

(22) Filed: Dec. 21, 2011

(65) Prior Publication Data

US 2012/0169902 A1     Jul. 5, 2012

(30) Foreign Application Priority Data

Jan. 5, 2011  (JP) ................................. 2011-000861
Jan. 5, 2011  (JP) ................................. 2011-000863
Jan. 27, 2011 (JP) ................................. 2011-015697

(51) Int. Cl.
*H04N 5/225*  (2006.01)

(52) U.S. Cl.
USPC .................. 348/239; 348/333.01; 348/333.02

(58) Field of Classification Search
None
See application file for complete search history.

(56) References Cited

U.S. PATENT DOCUMENTS

| 4,229,094 | A | * | 10/1980 | Baab et al. ..................... 396/342 |
| 6,985,177 | B2 | * | 1/2006 | Takahashi et al. ....... 348/208.99 |
| 7,679,645 | B2 | * | 3/2010 | Takahashi et al. ....... 348/208.11 |
| 2007/0024740 | A1 | * | 2/2007 | Strong .......................... 348/360 |
| 2011/0001868 | A1 | * | 1/2011 | Strong .......................... 348/345 |
| 2012/0070141 | A1 | * | 3/2012 | Scholz et al. ................. 396/342 |
| 2013/0038788 | A1 | * | 2/2013 | Strong .......................... 348/374 |

FOREIGN PATENT DOCUMENTS

JP     04-145421     5/1992
JP     2001-194700   7/2001

* cited by examiner

*Primary Examiner* — Twyler Haskins
*Assistant Examiner* — Angel L Garces-Rivera
(74) *Attorney, Agent, or Firm* — John C. Pokotylo; Straub & Pokotylo

(57) ABSTRACT

An image capturing apparatus includes: an optical system that includes a lens group including at least one lens, an optical axis of the optical system being able to be displaced; an image capturing unit that receives light collected by the optical system and generates electronic image data; a display unit that displays an image corresponding to the image data; and a display control unit that changes a display appearance of additional information, which is added to the image, according to a positional relationship between the optical axis and a light receiving surface of the image capturing unit.

21 Claims, 26 Drawing Sheets

| φ | 0° | 5° | 10° | ... | ...˻T1 |
|---|---|---|---|---|---|
| S | 0 mm | 0.1 mm | 0.2 mm | ... | ... |

| φ | 0° | 5° | 10° | ... | ...˻T2 |
|---|---|---|---|---|---|
| R | 100% | 98% | 96% | ... | ... |
| G | 100% | 96% | 92% | ... | ... |
| B | 100% | 93% | 85% | ... | ... |

W241

W242

W251

IMAGE CAPTURING APPARATUS, IMAGE CAPTURING METHOD, AND COMPUTER-READABLE RECORDING MEDIUM

CROSS-REFERENCE TO RELATED APPLICATIONS

This application is based upon and claims the benefit of priority from Japanese Patent Application No. 2011-000861, filed on Jan. 5, 2011, Japanese Patent Application No. 2011-000863, filed on Jan. 5, 2011 and Japanese Patent Application No. 2011-015697, filed on Jan. 27, 2011, the entire contents of which are incorporated herein by reference.

BACKGROUND OF THE INVENTION

1. Field of the Invention

The present invention relates to an image capturing apparatus that captures an image of a subject to generate electronic image data, an image capturing method, and a computer-readable recording medium.

2. Description of the Related Art

Conventionally, in image capturing apparatuses that capture an image of a subject to generate electronic image data, there is well known a technology in which, using an image shooting lens having a lens movement function or a mount adapter, an optical axis of the image shooting lens is tilted relative to an image sensor, which allows image shooting to be performed while a depth of field of the subject is adjusted (for example, see Japanese Laid-open Patent Publication No. 2001-194700).

SUMMARY OF THE INVENTION

An image capturing apparatus according to an aspect of the present invention includes: an optical system that includes a lens group including at least one lens, an optical axis of the optical system being able to be displaced; an image capturing unit that receives light collected by the optical system and generates electronic image data; a display unit that displays an image corresponding to the image data; and a display control unit that changes a display appearance of additional information, which is added to the image, according to a positional relationship between the optical axis and a light receiving surface of the image capturing unit.

An image capturing method according to another aspect of the present invention is performed by an image capturing apparatus including an optical system that includes a lens group including at least one lens and an image capturing unit that receives light collected by the optical system and generates electronic image data, the image capturing apparatus being able to displace an optical axis of the optical system, wherein the image capturing method includes: displaying an image corresponding to the image data; and changing a display appearance of additional information, which is added to the image, according to a positional relationship between the optical axis and a light receiving surface of the image capturing unit.

A non-transitory computer-readable storage medium according to still another aspect of the present invention has an executable program stored thereon, a processor being included in an image capturing apparatus including an optical system that includes a lens group including at least one lens and an image capturing unit that receives light collected by the optical system and generates electronic image data, the image capturing apparatus being able to displace an optical axis of the optical system, wherein the program instructs the processor to perform: displaying an image corresponding to the image data; and changing a display appearance of additional information, which is added to the image, according to a positional relationship between the optical axis and a light receiving surface of the image capturing unit.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, preferred embodiments of the invention will be described with reference to the drawings. The invention is not limited to the following embodiments.

First Embodiment

Figure 1:
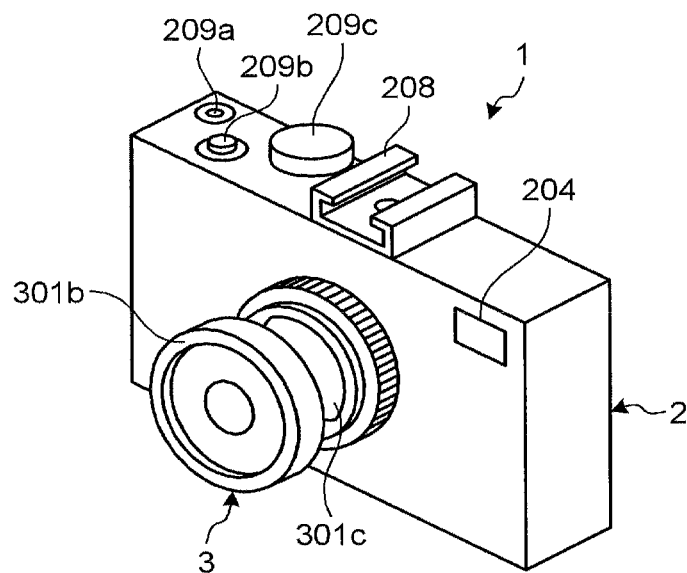
FIG. 1 is a perspective view illustrating a configuration on a side facing a subject in an image capturing apparatus according to a first embodiment of the invention.
Figure 2:
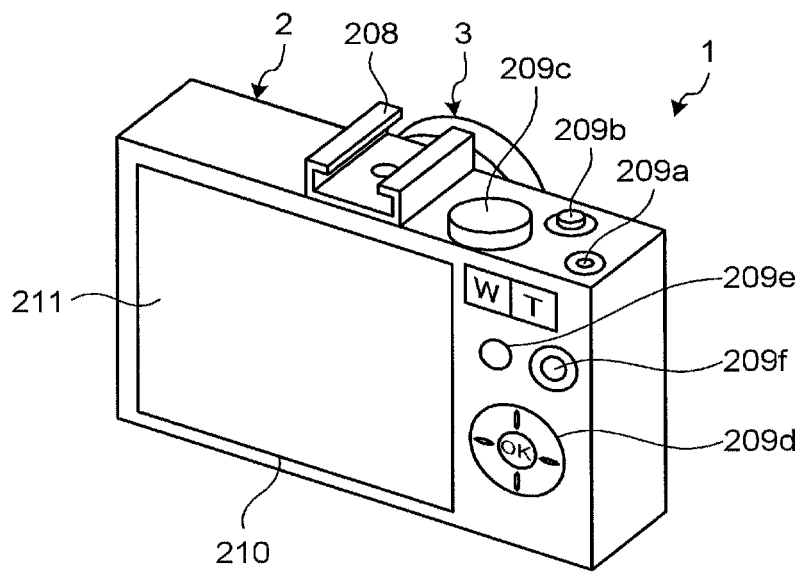
FIG. 2 is a perspective view illustrating a configuration on a side (rear side) facing an image shooting person in the image capturing apparatus of the first embodiment.
Figure 3:
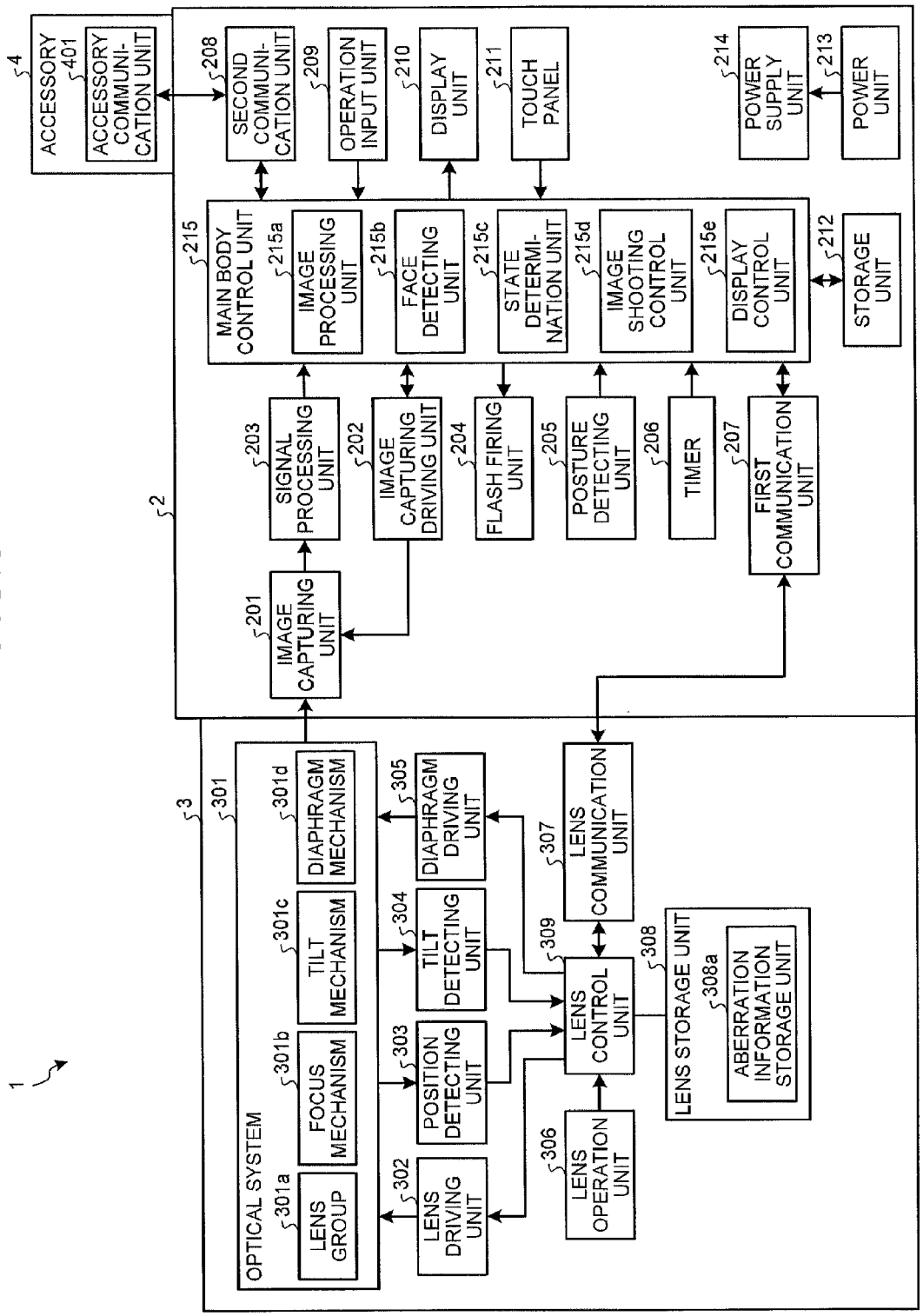
FIG. 3 is a block diagram illustrating a configuration of the image capturing apparatus of the first embodiment.

FIG. 1 is a perspective view illustrating a configuration on a side (front side) facing a subject in an image capturing apparatus according to a first embodiment of the invention. FIG. 2 is a perspective view illustrating a configuration on a side (rear side) facing an image shooting person in the image capturing apparatus of the first embodiment. FIG. 3 is a block diagram illustrating a configuration of the image capturing apparatus according to the first embodiment. An image capturing apparatus 1 of FIGS. 1 to 3 is a digital single-lens reflex camera, and the image capturing apparatus 1 includes a main body 2 and a lens unit 3 that is detachably attached to the main body 2. Accessories 4 such as an electronic viewfinder (EVF) and an electronic flash can also be attached to the image capturing apparatus 1.

As illustrated in FIGS. 1 to 3, the main body 2 includes an image capturing unit 201, an image capturing driving unit 202, a signal processing unit 203, a flash firing unit 204, a posture detecting unit 205, a timer 206, a first communication unit 207, a second communication unit 208, an operation input unit 209, a display unit 210, a touch panel 211, a storage unit 212, a power unit 213, a power supply unit 214, and a main body control unit 215.

The image capturing unit 201 includes a shutter and an image sensor, such as a CCD (Charge Coupled Device) and a CMOS (Complementary Metal Oxide Semiconductor), which receives light collected by the lens unit 3 and converts the light into an electric signal.

The image capturing driving unit has a function of driving the image sensor and the shutter according to a release signal.

For example, the image capturing driving unit 202 causes the image sensor to output image data (analog signal) to the signal processing unit 203 in predetermined timing.

For example, the flash firing unit 204 includes a xenon lamp or an LED (Light Emitting Diode). The flash firing unit 204 illuminates a visual field region, where the image is captured by the image capturing apparatus 1, with strobe light as fill light.

The posture detecting unit 205 includes an acceleration sensor. The posture detecting unit 205 detects a posture state of the image capturing apparatus 1 by detecting acceleration of the image capturing apparatus 1. Specifically, the posture detecting unit 205 detects a posture (tilt angle) of the image capturing apparatus 1 with reference to a horizontal plane.

The timer 206 has a timer function and a function of determining time and date of image shooting. The timer 206 outputs time and date data to the main body control unit 215 in order to add the time and date data to the captured image data.

The first communication unit 207 is a communication interface that conducts communication with the lens unit 3 attached to the main body 2. The second communication unit 208 is a communication interface that conducts communication with an accessory communication unit 401 of the accessory 4 attached to the main body 2.

As illustrated in FIGS. 1 and 2, the operation input unit 209 includes a power switch 209a that switches a power state of the image capturing apparatus 1 to an on-state or an off-state, a release switch 209b that inputs a still image release signal providing an instruction to shoot a still image, an image shooting mode selector switch 209c that inputs a switch signal providing an instruction to switch various image shooting modes into which the image capturing apparatus 1 is put, an operation switch 209d that inputs an instruction signal providing an instruction to select or decide various settings of the image capturing apparatus 1, a menu switch 209e that inputs an instruction signal providing an instruction to display an operation menu screen set to the image capturing apparatus 1, and a moving image switch 209f that inputs a moving image release signal providing an instruction to shoot a moving image.

The display unit 210 is constructed using a display panel made of liquid crystal or organic EL (Electro Luminescence), for example. The display unit 210 suitably displays operation information on the image capturing apparatus 1 and information on the image shooting in addition to the image data.

The touch panel 211 is provided on a display screen of the display unit 210. The touch panel 211 detects a contact position in which a user touches the touch panel 211 based on information displayed by the display unit 210, and the touch panel 211 receives an input of a manipulation signal corresponding to the detected contact position. Examples of the touch panels include a resistance film touch panel, an electrostatic capacitance touch panel, and an optical touch panel. In the first embodiment, any type of touch panel may be used.

The storage unit 212 is constructed using semiconductor memory, such as flash memory and DRAM (Dynamic Random Access Memory), which is fixedly provided in the image capturing apparatus 1. Various programs for operating the image capturing apparatus 1, an image capturing program of the first embodiment, various pieces of data and parameters used in executing the programs are stored in the storage unit 212. The image data is stored in the storage unit 212, and pieces of information such as information on the lens unit 3 attachable to the main body 2 and image data correction information corresponding to a type of the lens unit 3 are stored in the storage unit 212. The storage unit 212 may include a computer-readable storage medium such as a memory card attached from the outside.

The power unit 213 includes a battery that is detachably attached to the image capturing apparatus 1. The power supply unit 214 supplies a power of the power unit 213 to each unit (including the attached lens unit 3 and accessory 4) of the image capturing apparatus 1. The power supply unit 214 may supply the power from an external power unit (not illustrated) to each unit of the image capturing apparatus 1.

The main body control unit 215 includes a CPU (Central Processing Unit), for example. The main body control unit 215 wholly controls the operation of the image capturing apparatus 1 by transferring the instruction or data corresponding to each unit of the image capturing apparatus 1 according to the instruction signal or the switch signal from the operation input unit 209 or the touch panel 211. The main body control unit 215 includes an image processing unit 215a, a face detecting unit 215b, a state determination unit 215c, an image shooting control unit 215d, and a display control unit 215e.

The image processing unit 215a performs various pieces of image processing to the image data input from the signal processing unit 203, and outputs the image data to the storage unit 212. Specifically, the image processing unit 215a performs pieces of image processing including at least edge enhancement, white balance, color correction, and gamma correction to the image data.

The face detecting unit 215b detects a face of a person included in the image corresponding to the image data by pattern matching. The face detecting unit 215b may detect not only the human face but also faces of a dog, a cat, and the like. The face detecting unit 215b may also detect the face of the person using a well-known technology other than the pattern matching.

The state determination unit 215c determines the state of the lens unit 3 based on the information on the state of the lens unit 3, which is input from the first communication unit 207.

The image shooting control unit 215d performs control to start an image shooting operation of the image capturing apparatus 1 when the still image release signal is input. As used herein, the image shooting operation of the image capturing apparatus 1 means an operation in which the signal processing unit 203 and the image processing unit 215a perform predetermined pieces of processing to the image data, which is output from the image capturing unit 201 by the drive of the image capturing driving unit 202. The main body control unit 215 records the image data to which the pieces of processing are performed in the storage unit 212. The image shooting control unit 215d also performs control to start the image shooting operation of the image capturing apparatus according to a determination result of the state determination unit 215c.

The display control unit 215e causes the display unit 210 to display the operation menu screen when the instruction signal is input from the menu switch 209e. The display control unit 215e causes the display unit 210 to display information before the image capturing apparatus 1 performs the image shooting. Specifically, the display control unit 215e causes the display unit 210 to display a time until the image capturing apparatus 1 starts the image shooting. According to the determination result of the state determination unit 215c, the display control unit 215e causes the display unit 210 to display a focus region where an optical system 301 comes into focus and/or an out-of-focus region where the optical system 301 does not come into focus in the region of the image displayed by the display unit 210.

The main body 2 having the above configuration may also have a sound input and output function and a communication function of conducting communication through the Internet.

The lens unit 3 is a tilt lens in which an optical axis of the optical system 301 can tilt all-around with reference to a direction perpendicular to the light receiving surface of the image capturing unit 201.

The lens unit 3 includes the optical system 301, a lens driving unit 302, a position detecting unit 303, a tilt detecting unit 304, a diaphragm driving unit 305, a lens operation unit 306, a lens communication unit 307, a lens storage unit 308, and a lens control unit 309.

The optical system 301 includes a lens group 301a that includes one or plural lenses, a focus mechanism 301b that adjust the focus of the lens group 301a, a tilt mechanism 301c that tilts the optical axis of the optical system 301 relative to the light receiving surface of the image capturing unit 201, and a diaphragm mechanism 301d that restricts an incident amount of light collected by the lens group 301a.

For example, the lens driving unit 302 includes a DC motor or a stepping motor. The lens driving unit 302 drives the focus mechanism 301b to move the lens group 301a of the optical system 301 on the optical axis, thereby adjusting the focus of the optical system 301.

The position detecting unit 303 detects the position of the lens group 301a in the optical axis direction. The tilt detecting unit 304 detects a tilt amount that is of a displacement amount from a reference position, in which the optical axis of the optical system 301 and the light receiving surface of the image capturing unit 201 are orthogonal to each other. In this sense, the tilt detecting unit 304 acts as a displacement amount detecting unit in the first embodiment.

The diaphragm driving unit 305 includes a stepping motor, for example. The diaphragm driving unit 305 drives the diaphragm mechanism 301d to adjust the amount of light incident to the image capturing unit 201.

The lens operation unit 306 is a focus ring that is provided around a lens barrel of the lens unit 3, and a signal for manipulating the lens group 301a of the optical system 301 is input to the lens operation unit 306. The lens operation unit 306 may be a push switch.

The lens communication unit 307 is a communication interface that conducts communication with the first communication unit 207 of the main body 2 when the lens unit 3 is attached to the main body 2.

A control program and various parameters, which decide the position and movement of the lens group 301a of the optical system 301, are stored in the lens storage unit 308. The lens storage unit 308 includes an aberration information storage unit 308a in which pieces of aberration information on various aberrations of the lens unit 3 are stored. Additionally, tilt angle limit information on the lens unit 3, closest focusing distance limit information, constraint condition information constraining the movement of the lens unit 3, focus position information corresponding to the tilt angle of the optical system 301, a range where the lens unit 3 can be brought up, and focus position information decided by the tilt angle of the optical system 301 and a bringing-up amount of the lens unit 3 are stored in the lens storage unit 308.

Figures 4, 5, 6:
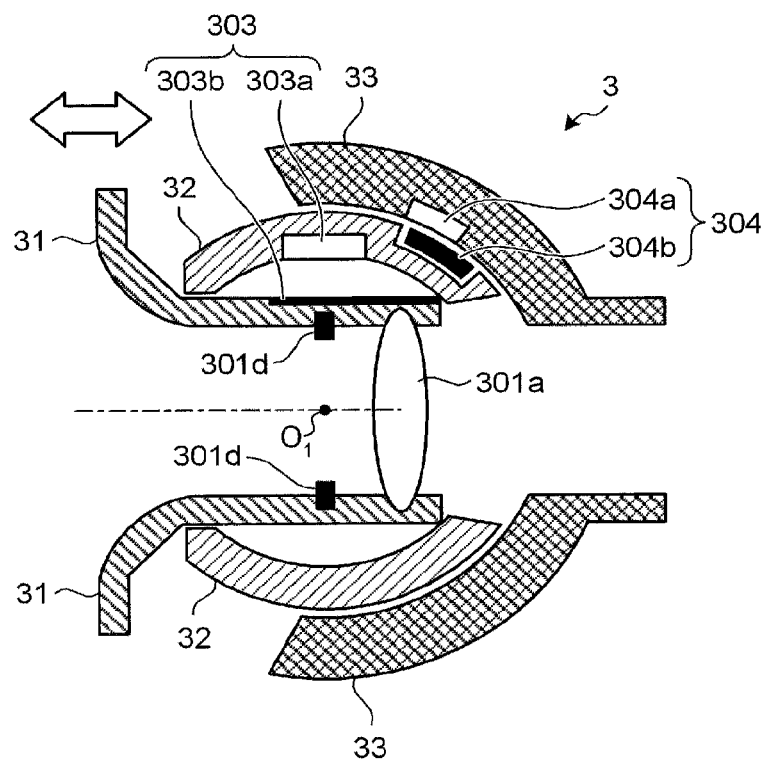
FIG. 4 is a view illustrating an example of aberration information on a lens unit stored in an aberration information storage unit of the image capturing apparatus of the first embodiment.
FIG. 5 is a view illustrating another example of the aberration information on the lens unit stored in the aberration information storage unit of the image capturing apparatus of the first embodiment.
FIG. 6 is a sectional view schematically illustrating a configuration of a main part of the lens unit in the image capturing apparatus of the first embodiment.

FIG. 4 is a view illustrating an example of aberration information on the lens unit 3 stored in the aberration information storage unit 308a. As illustrated in FIG. 4, an aberration information table T1 describes a relationship between a deviation angle $\phi$ (that is, a field angle $\phi$ when the optical axis direction is set to 0) from the optical axis and an aberration (such as a curved field amount and an astigmatism) S when the image, which is formed while located distant from the optical system 301 by a focal distance, is viewed from a center of the optical system 301. For example, the aberration S is 0.1 mm in the case of the deviation angle $\phi$ of 5°.

FIG. 5 is a view illustrating another example of the aberration information on the lens unit 3 stored in the aberration information storage unit 308a. As illustrated in FIG. 5, an aberration information table T2 describes a relationship between the deviation angle $\phi$ and a color aberration. For example, in the case of the deviation angle $\phi$ of 5°, magnifications are 98%, 96%, and 93% for ideal image heights of R (Red), G (Green), and B (Blue), respectively. For example, in the case of the deviation angle $\phi$ of 10°, magnifications are 96%, 92%, and 85% for the ideal image heights of R, G, and B, respectively. Generally, a refractive index is increased with decreasing wavelength. Therefore, a distortion of a B component having the smallest wavelength becomes the maximum in the three components R, G, and B. The distortion (color aberration) in each color is increased with increasing deviation angle $\phi$.

The lens control unit 309 includes a CPU (Central Processing Unit), for example. The lens control unit 309 controls the operation of the lens unit 3 in response to the instruction signal from the main body 2.

A configuration of a main part of the lens unit 3 will be described with reference to FIG. 6. FIG. 6 is a sectional view schematically illustrating the configuration of the main part of the lens unit 3. In FIG. 6, the left side is a subject side (hereinafter referred to as a front side) and the right side is a side (hereinafter referred to as a back side) that is attached to the main body 2.

As illustrated in FIG. 6, the lens unit 3 includes a first frame 31 that retains the lens group 301a and the diaphragm mechanism 301d, a second frame 32 that retains the first frame 31 while the first frame 31 can move in a front-back direction, and a third frame 33 that retains the second frame 32 while the second frame 32 can tilt about a center point $O_1$. The position detecting unit 303 is provided inside the second frame 32, and the tilt detecting unit 304 is provided inside the third frame 33.

For example, the position detecting unit 303 includes a reflection displacement sensor. Specifically, the position detecting unit 303 includes a photo interrupter 303a that includes a light emitting element and a light receiving element and a reflection member 303b that has a reflectance depending on the position. The photo interrupter 303a is provided on an inner circumferential side of the second frame 32, and the reflection member 303b is provided on an outer circumferential side of the first frame 31. The light emitted from the photo interrupter 303a is reflected by the reflection member 303b, and the light reflected by the reflection member 303b is received by the photo interrupter 303a, whereby the position detecting unit 303 calculates the bringing-up amount of the first frame 31 brought up from the center point $O_1$ and detects the position of the lens group 301a in the optical axis direction from the calculated bringing-up amount. Various position sensors may be used as the position detecting unit 303. The reflection member 303b is used as another member, but the reflection member 303b may be produced by integral molding of members having different reflectances.

The tilt detecting unit 304 detects the tilt angle of the second frame 32 relative to the center point $O_1$, thereby detecting the direction toward which the optical axis of the optical system 301 is oriented from the position in which the optical axis of the optical system 301 and the light receiving surface of the image capturing unit 201 are orthogonal to each other. The tilt detecting unit 304 includes a photo interrupter 304a and a reflection member 304b. Various position sensors may be used as the tilt detecting unit 304. The reflection member 304b is used as another member, but the reflection member 304b may be produced by integral molding of members having different reflectances.

The lens unit 3 having the above configuration comes into focus only in a neighborhood of the optical axis of the optical system 301, and a radially spread out-of-focus region is generated in a periphery of the neighborhood. In the lens unit 3, the aberration becomes the maximum on an opposite side to the side on which the optical axis is tilted.

Figure 7:
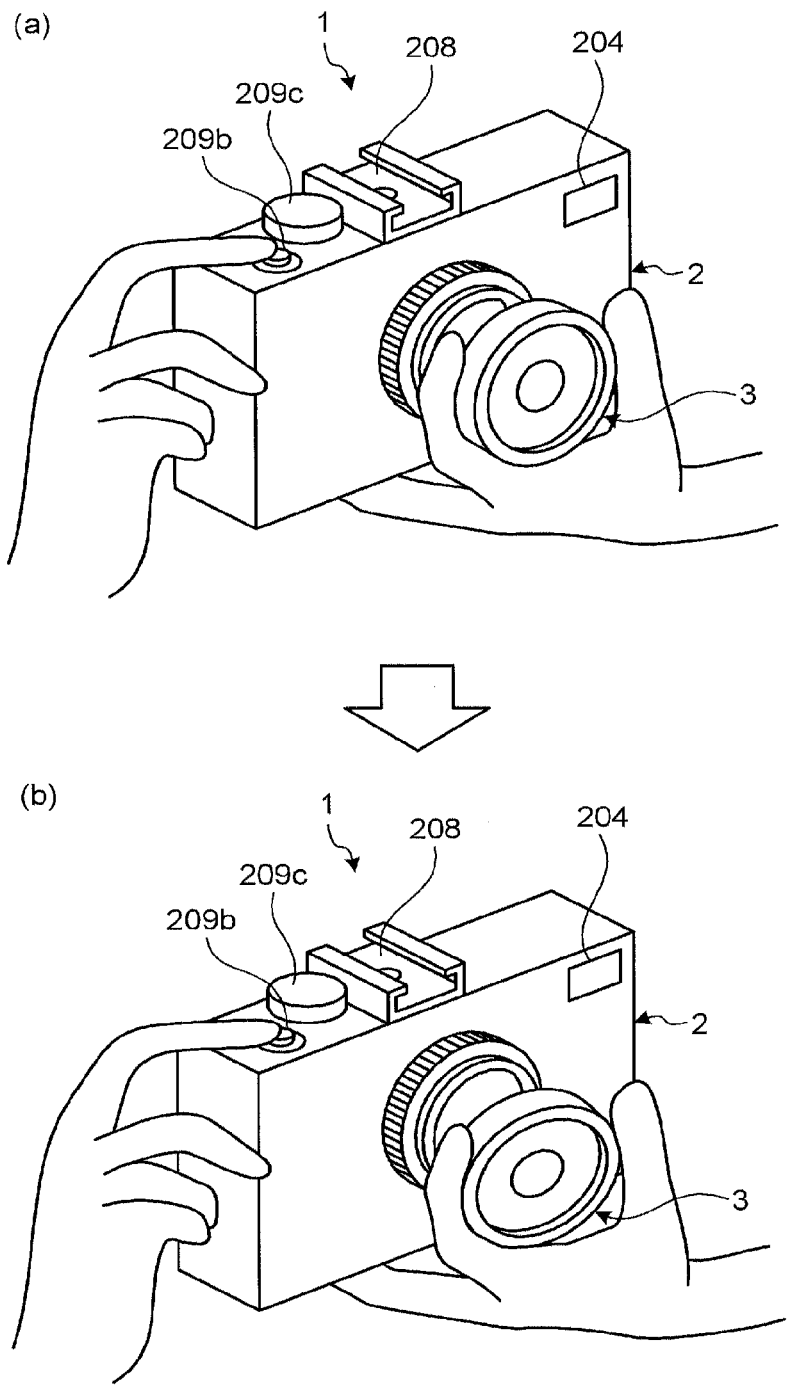
FIG. 7 is a view schematically illustrating a method for manipulating the lens unit in the image capturing apparatus of the first embodiment.
Figure 8:
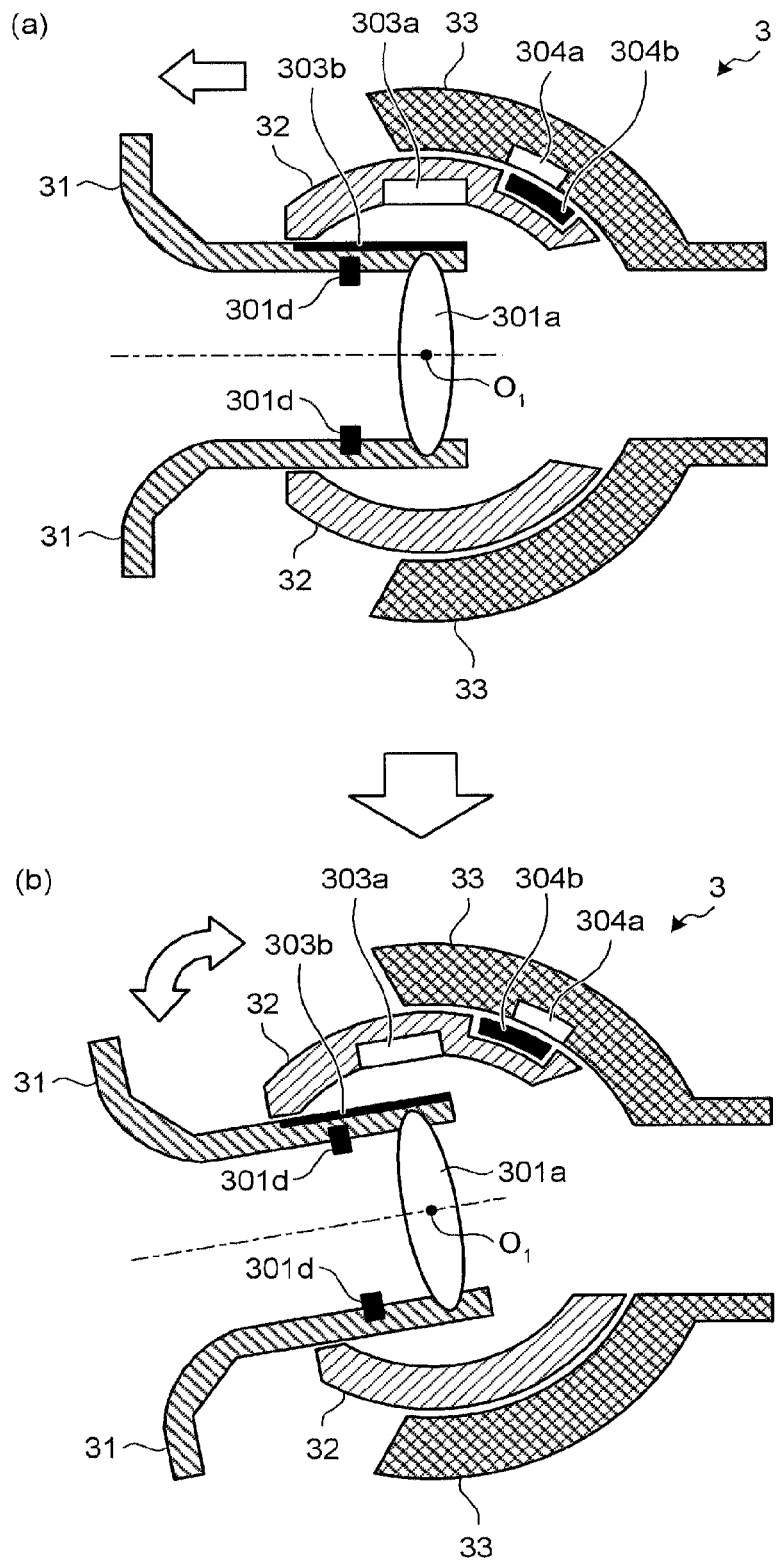
FIG. 8 is a view schematically explaining an outline of the lens unit operated by a manipulation of FIG. 7.

A method for manipulating the lens unit 3 having the above configuration will be described. FIG. 7 is a view schematically illustrating the method for manipulating the lens unit 3. FIG. 8 is a view schematically explaining an outline of the lens unit 3 operated by the manipulation of FIG. 7.

As illustrated in FIGS. 7 and 8, when the user manipulates the lens operation unit 306 to adjust the focus of the optical system 301 (FIG. 7(a)), the lens control unit 309 brings up the first frame 31 forward according to the operation amount of the lens operation unit 306 (FIG. 8(a)). Therefore, the focus of the optical system 301 is adjusted in the lens unit 3. Then, the tilt mechanism 301c tilts the first frame 31 (FIG. 8(b)) according to the manipulation of the lens barrel by the user (FIG. 7(b)). Therefore, in the lens unit 3, the optical axis of the optical system 301 can be changed from the position orthogonal to the light receiving surface of the image capturing unit 201.

A change in aberration, which is generated by changing the optical axis of the lens unit 3 relative to the light receiving surface of the image capturing unit 201, will be described below. FIGS. 9 to 12 are views schematically explaining the change in aberration, which is generated by changing the optical axis of the lens unit 3 relative to a direction perpendicular to the light receiving surface of the image capturing unit 201. FIGS. 9 to 12 illustrate the case in which the lens group 301a includes one lens. Hereinafter, a state in which the optical axis of the optical system 301 is orthogonal to the light receiving surface of the image capturing unit 201 while passing through the center of the light receiving surface of the image capturing unit 201 is referred to as an "initial state".

Figure 9:
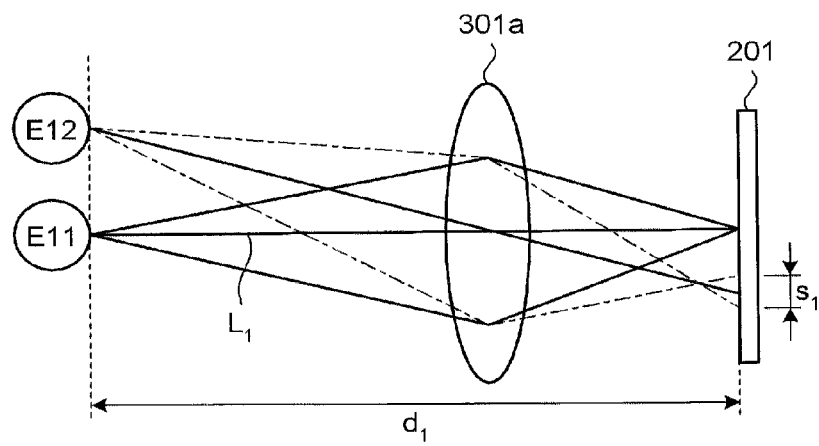
FIG. 9 is a view schematically explaining a change in aberration, which is generated by changing an optical axis of the lens unit relative to a direction perpendicular to a light receiving surface of an image capturing unit, in the image capturing apparatus of the first embodiment.

As illustrated in FIG. 9, when the lens group 301a whose aberration is insufficiently corrected is focused on a subject E11 while distances from the light receiving surface of the image capturing unit 201 to two subjects E11 and E12 are equal to each other ($d_1$), because an aberration $s_1$ is generated in the image of the subject E12 formed on the image capturing unit 201, the image of the subject E12 becomes out-of-focus. However, the aberration is actively utilized as one of expressions, which allows a change to be exerted in the expression of the captured image.

Figure 10:
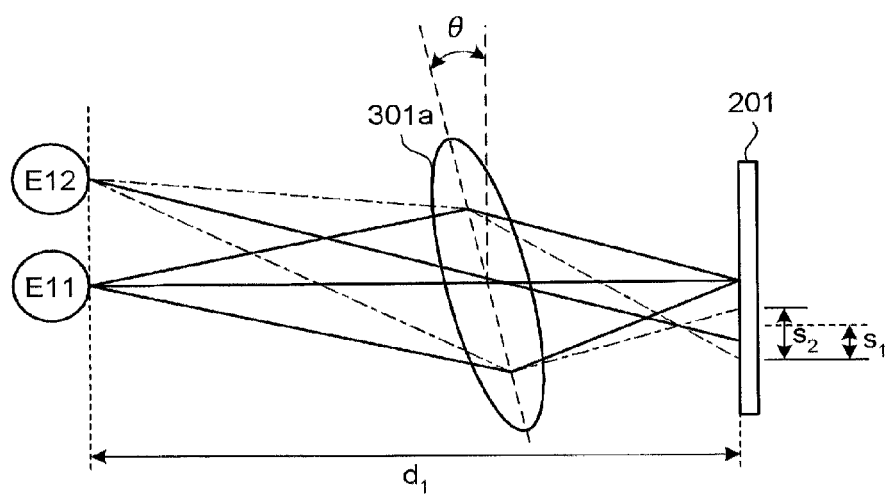
FIG. 10 is a view schematically explaining an example (first example) of the change in aberration, which is generated by changing the optical axis of the lens unit relative to a direction orthogonal to the light receiving surface of the image capturing unit, in the image capturing apparatus of the first embodiment.

As illustrated in FIG. 10, when the lens group 301a is tilted at a tilt angle θ (for example, θ=5°) relative to the light receiving surface of the image capturing unit 201, because the image of the subject E12 is further incident from the periphery of an optical axis $L_1$, an aberration $s_2$ of the subject E12 formed on the image capturing unit 201 becomes larger than the aberration $s_1$ ($s_1 < s_2$). Therefore, in the captured image, a difference between the subjects E11 and E12 is further enhanced. In FIG. 10, although actually an off-axis aberration is also generated for the subject E11, it is assumed that the tilt angle θ from the initial state of the lens group 301a is small to an extent in which the tilt angle θ has a little influence on the image of the subject E11.

Figure 11:
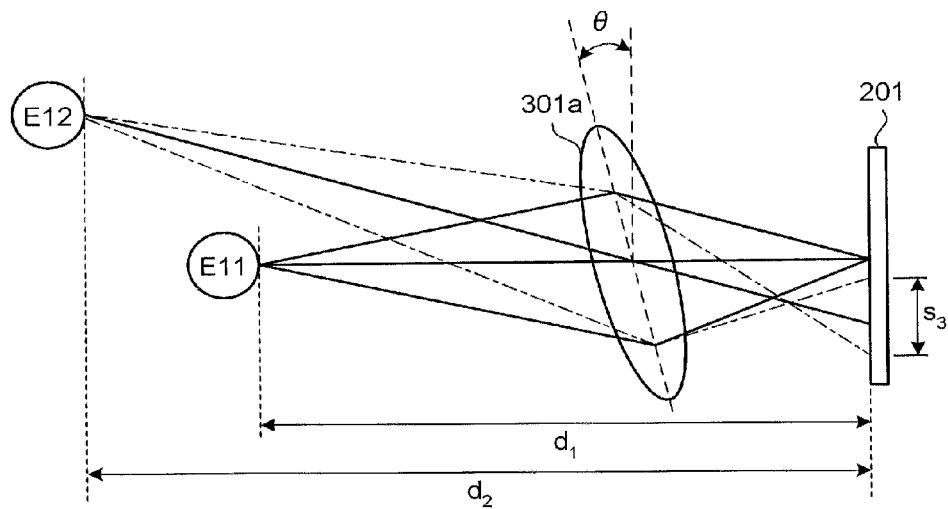
FIG. 11 is a view schematically explaining an example (second example) of the change in aberration, which is generated by changing the optical axis of the lens unit relative to the direction orthogonal to the light receiving surface of the image capturing unit, in the image capturing apparatus of the first embodiment.

As illustrated in FIG. 11, when the distance $d_1$ from the image capturing unit 201 to the subject E11 is shorter than a distance $d_2$ from the image capturing unit 201 to the subject E12 ($d_1 < d_2$), because the image of the subject E12 is incident from a position farther away from the optical axis $L_1$ compared with the case illustrated in FIG. 10, an aberration $s_3$ of the subject E12 formed on the image capturing unit 201 becomes larger than the aberration $s_2$ ($s_2 < s_3$). In FIG. 11, it is also assumed that the tilt angle θ from the initial state of the lens group 301a is small to an extent in which the tilt angle θ has a little influence on the image of the subject E11.

Figure 12:
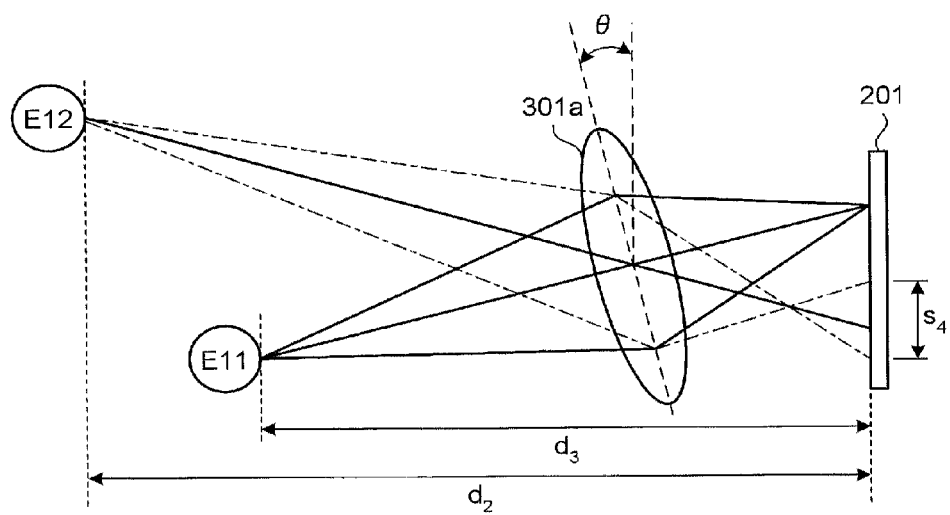
FIG. 12 is a view schematically explaining an example (third example) of the change in aberration, which is generated by changing the optical axis of the lens unit relative to the direction orthogonal to the light receiving surface of the image capturing unit, in the image capturing apparatus of the first embodiment.

As illustrated in FIG. 12, when a distance $d_3$ from the image capturing unit 201 to the subject E11 is shorter than the distance $d_2$ ($d_3 < d_2$), and when the subject E11 is located on the optical axis $L_1$ of the lens group 301a after the lens group 301a is tilted from the initial state, the difference between the subjects E11 and E12 is further enhanced by focusing the lens group 301a on the subject E11.

Figure 13:
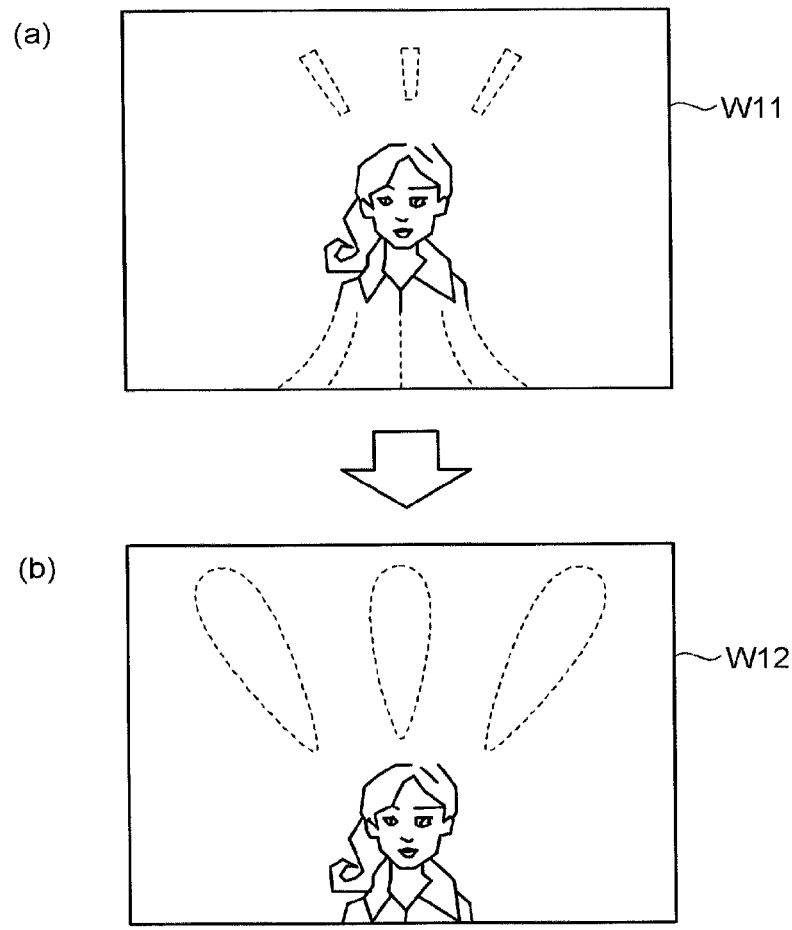
FIG. 13 is a view illustrating an example of an image generated by the image capturing apparatus of the first embodiment.

FIG. 13 is a view illustrating an example of a change in image corresponding to the change in optical axis of the optical system 301. An image W11 of FIG. 13(a) is captured by focusing the lens group 301a in the initial state on the face of the person that is of the subject. An image W12 of FIG. 13(b) is captured by focusing the lens group 301a on the face of the person while the lens group 301a is tilted from the initial state. When compared the image W11 with the image W12, although the out-of-focus region is radially spread in the periphery of the face of the person in both the images W11 and W12 (indicated by broken lines), the image W12 is larger than the image W11 in an out-of-focus amount (aberration). Therefore, in the case of the optical system 301, the image in which the difference between the neighborhood of the optical axis and the periphery of the neighborhood is further enhanced can be captured by tilting the lens group 301a from the initial state.

A lens unit other than the lens unit 3 that is of the tilt lens can be attached to the image capturing apparatus 1 having the above configuration. Hereinafter, the lens unit that can be attached to the image capturing apparatus 1 is collectively referred to as a "lens unit 3G". It is assumed that the lens unit 3G includes at least the lens communication unit 307 and the lens control unit 309.

Figure 14:
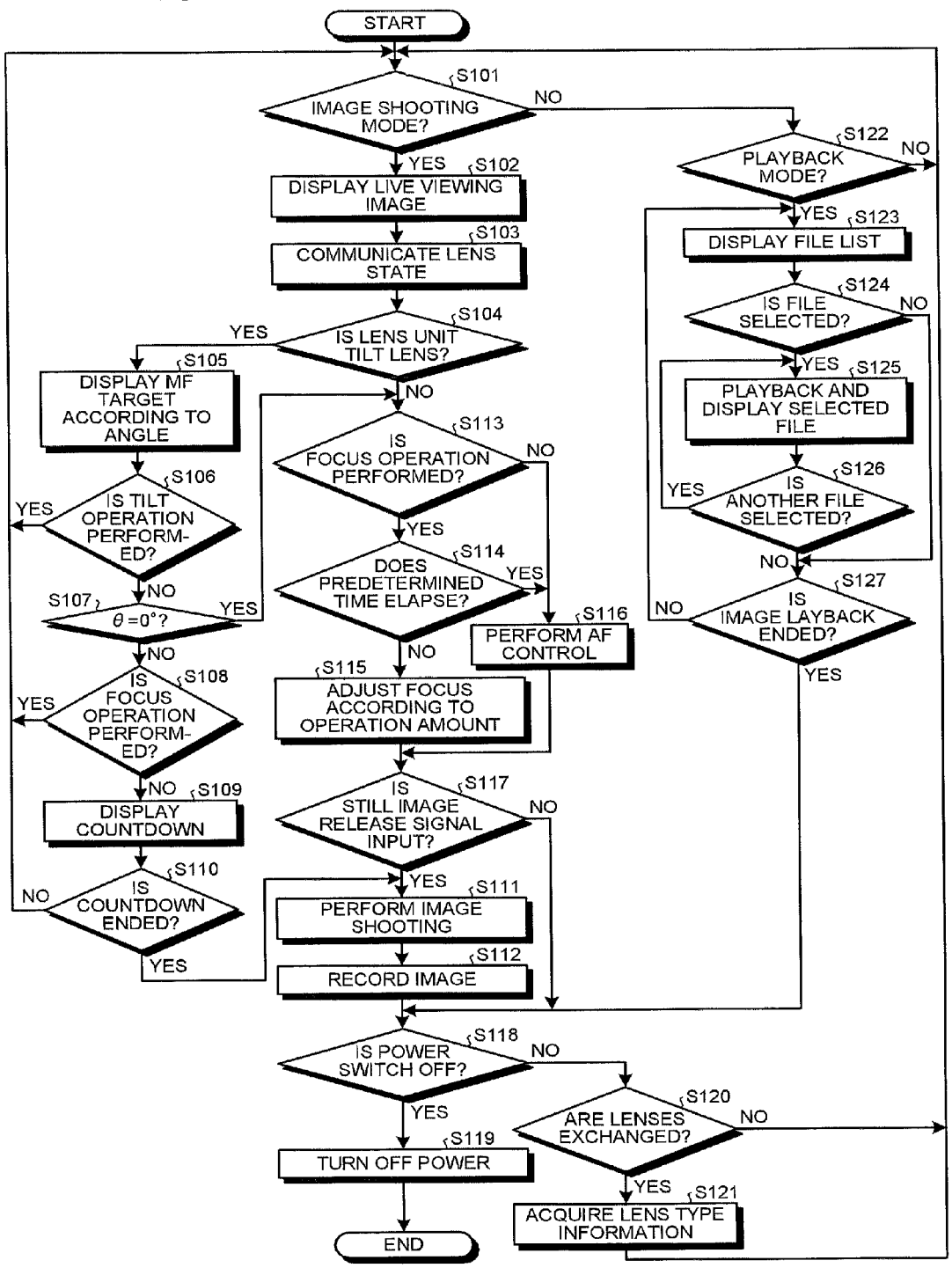
FIG. 14 is a flowchart illustrating an outline of processing performed by the image capturing apparatus of the first embodiment.

An operation performed by the image capturing apparatus 1 having the above configuration will be described below. FIG. 14 is a flowchart illustrating an outline of processing performed by the image capturing apparatus 1.

In FIG. 14, the case in which the image capturing apparatus 1 is put in the image shooting mode (Yes in Step S101) will be described. The display control unit 215e causes the display unit 210 to display a live viewing image (Step S102). The lens control unit 309 communicates a lens state of the lens unit 3G to the main body control unit 215 (Step S103).

The main body control unit 215 determines whether the lens unit 3G attached to the main body 2 is the tilt lens based on the signal input from the lens control unit 309 (Step S104). When the lens unit 3G attached to the main body 2 is the tilt lens (Yes in Step S104), the image capturing apparatus 1 goes to Step S105. On the other hand, when the lens unit 3G attached to the main body 2 is not the tilt lens (No in Step S104), the image capturing apparatus 1 goes to Step S113.

The case in which the lens unit 3G attached to the main body 2 is the tilt lens (Yes in Step S104) will be described. Hereinafter, the lens unit 30 is referred to as the lens unit 3 in pieces of processing in Steps S105 to S110 in the case in which the lens unit 3G is the tilt lens. In this case, according to the angle of the optical axis of the optical system 301, which is detected by the tilt detecting unit 304, the display control unit 215e causes the display unit 210 to display an MF (Manual Focus) target corresponding to the focus region where the optical system 301 comes into focus in the region of the live viewing image displayed by the display unit 210 (Step S105).

Figure 15:
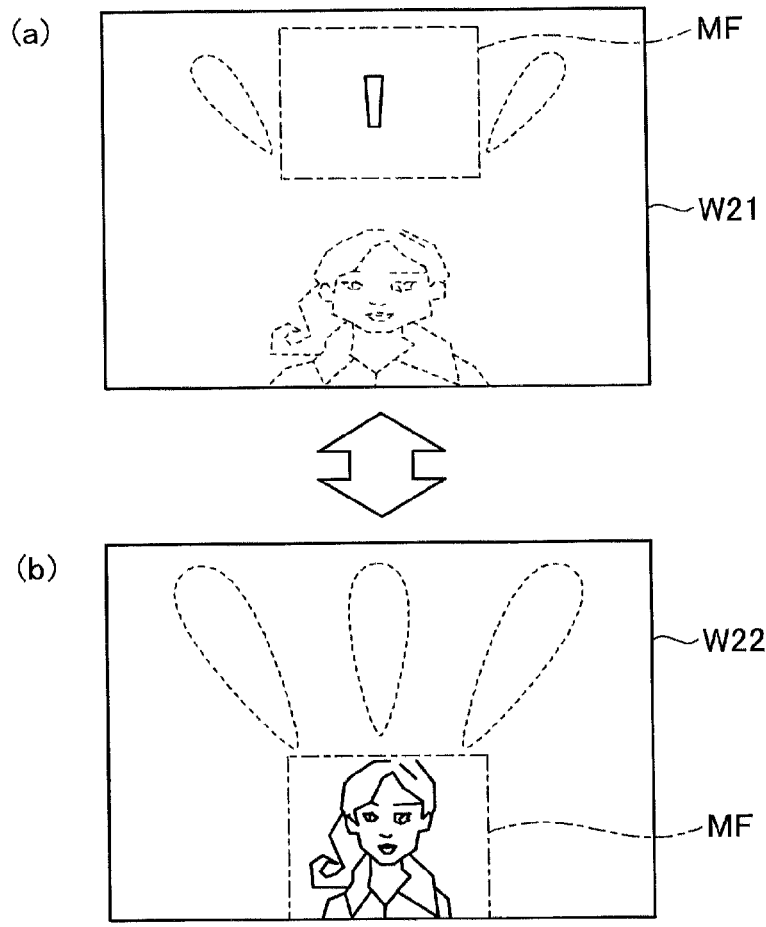
FIG. 15 is a view illustrating an example of an image displayed by a display unit of the image capturing apparatus of the first embodiment.

FIG. 15 is a view explaining a focus region that the display control unit 215e causes the display unit 210 to display. For example, when the optical axis of the optical system 301 is tilted upward relative to the light receiving surface of the image capturing unit 201, the display control unit 215e causes the display unit 210 to display the focus region of the lens unit 3 in a live viewing image W21 displayed by the display unit 210 using a rectangular frame MF as illustrated in FIG. 15(a). Therefore, the user can intuitively recognize the out-of-focus region that is radially spread from the focus region of the lens unit 3. When the optical axis of the optical system 301 is tilted downward relative to the light receiving surface of the image capturing unit 201, the display control unit 215e causes the display unit 210 to display the focus region of the lens unit 3 in a live viewing image W22 displayed by the display unit 210 using the rectangular frame MF as illustrated in FIG. 15(b). Therefore, the user can perform the image shooting while seeing the live viewing image to ensure the focus region of the lens unit 3.

The state determination unit 215c determines whether the tilt operation of the lens unit 3 is performed (Step S106). Specifically, the state determination unit 215c determines whether the tilt detecting unit 304 of the lens unit 3 detects the tilt of the optical system 301. When the tilt operation of the lens unit 3 is performed (Yes in Step S106), the image capturing apparatus 1 returns to Step S101. On the other hand, when the tilt operation of the lens unit 3 is not performed within a predetermined time (for example, 3 seconds) since the previous tilt operation (No in Step S106), the image capturing apparatus 1 goes to Step S107.

In Step S107, the image shooting control unit 215d determines whether the tilt angle $\theta$ of the optical axis of the optical system 301 relative to the reference position is 0°. When the tilt angle $\theta$ of the optical axis of the optical system 301 relative to the reference position is 0° (Yes in Step S107), the image capturing apparatus 1 goes to Step S113. On the other hand, when the tilt angle $\theta$ of the optical axis of the optical system 301 relative to the reference position is not 0° (No in Step S107), the image shooting control unit 215d determines whether the focus operation (bringing-up manipulation) to adjust the focus of the lens unit 3 is performed (Step S108). Specifically, the image shooting control unit 215d determines whether the focus operation of the lens unit 3 is performed according to the detection result of the position detecting unit 303 of the lens unit 3. When the focus operation of the lens unit 3 is performed (Yes in Step S108), the image capturing apparatus 1 returns to Step S101. On the other hand, when the focus operation of the lens unit 3 is not performed within a predetermined time (for example, 3 seconds) since the previous focus operation (No in Step S108), the image capturing apparatus 1 goes to Step S109.

Figure 16:
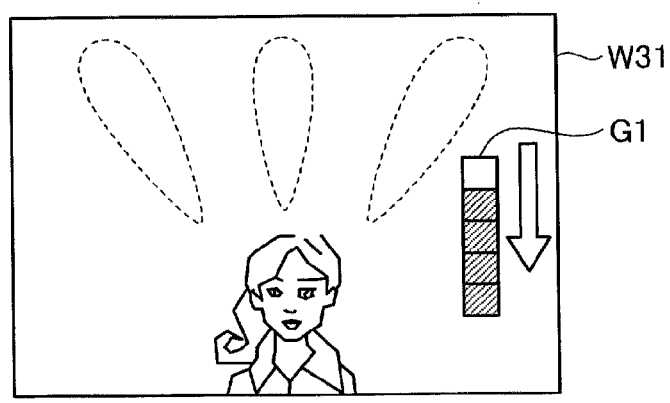
FIG. 16 is a view illustrating an example of the image displayed by the display unit of the image capturing apparatus of the first embodiment.

In Step S109, the display control unit 215e causes the display unit 210 to display a countdown that is of information until the image capturing apparatus 1 performs the image shooting. For example, as illustrated in FIG. 16, the display control unit 215e causes the display unit 210 to display a time gage G1 as the countdown until the image capturing apparatus 1 performs the image shooting in a live viewing image W31 displayed by the display unit 210. Therefore, when the user does not want to cause the image capturing apparatus 1 to perform the image shooting, the user can stop the image shooting of the image capturing apparatus 1 by performing the tilt operation or the focus operation of the lens unit 3 before the count of the time gage G1 runs out. The user can visually and intuitively recognize the time until the image capturing apparatus 1 performs the image shooting.

Then, the image shooting control unit 215d determines whether the countdown is ended (Step S110). When the countdown is not ended (No in Step S110), the image capturing apparatus 1 returns to Step S101. On the other hand, when the countdown is ended (Yes in Step S110), the image capturing apparatus 1 goes to Step S111.

The image capturing apparatus 1 performs the image shooting under the control of the image shooting control unit 215d (Step S11), and the image capturing apparatus 1 records the acquired image data in the storage unit 212 (Step S112).

The case in which the lens unit 3G attached to the main body 2 is not the tilt lens (No in Step S104) will be described. When the focus operation to adjust the focus of the lens unit 3 is performed (Yes in Step S113), and when the predetermined time (for example, 3 seconds) does not elapse since the focus operation is performed (No in Step S114), the lens control unit 309 adjusts the focus of the lens unit 3G according to the operation amount of the focus operation (Step S115), and the image capturing apparatus 1 goes to Step S117. On the other hand, when the focus operation is performed (Yes in Step S113), and when the predetermined time (for example, 3 seconds) elapses since the focus operation is performed (Yes in Step S114), the lens control unit 309 drives the lens driving unit 302 to perform the AF control of the lens unit 3G (Step S116), and the image capturing apparatus 1 goes to Step S117.

When the focus operation to adjust the focus of the lens unit 3 is not performed (No in Step S113), the image capturing apparatus 1 goes to Step S116.

When the release switch 209b is pressed to input the still image release signal (Yes in Step S117), the image capturing apparatus 1 goes to Step S111.

When the still image release signal is not input through the release switch 209b (No in Step S117), the image capturing apparatus 1 goes to Step S118.

After Step S112, when the power switch 209a is pressed (Yes in Step S118), the main body control unit 215 performs control to turn off the power supply (Step S119), and the series of pieces of processing is ended.

After Step S112, when the power switch 209a is not pressed (No in Step S118), and when the lens unit 3G is replaced with another lens unit 3G (Yes in Step S120), the main body control unit 215 acquires the lens type information from the newly-attached lens unit 3G (Step S121). Then the image capturing apparatus 1 returns to Step S101. On the other hand, when the power switch 209a is not pressed (No in Step S118), and when the lens unit 3G is not replaced with another lens unit 3G (No in Step S120), the image capturing apparatus 1 returns to Step S101.

The case in which the image capturing apparatus 1 is not put in the image shooting mode (No in Step S101) will be described below. When the image capturing apparatus 1 is put in a playback mode (Yes in Step S122), the display control unit 215e causes the display unit 210 to display a file list (Step S123).

When a file that is displayed while enlarged is selected through the operation input unit 209 or the touch panel 211 (Yes in Step S124), the display control unit 215e causes the display unit 210 to perform the playback display of the selected file (Step S125).

When another image file is newly selected (Yes in Step S126), the image capturing apparatus 1 returns to Step S125. On the other hand, when another image file is not selected (No in Step S126), the image capturing apparatus 1 goes to Step S127.

When an instruction to end the image playback is input through the operation input unit 209 or the touch panel 211 (Yes in Step S127), the image capturing apparatus 1 goes to Step S118. On the other hand, when the end instruction is not input (No in Step S127), the image capturing apparatus 1 returns to Step S123.

When the file is not selected (No in Step S124), the image capturing apparatus 1 goes to Step S127.

When the image capturing apparatus 1 is not put in the playback mode (No in Step S122), the image capturing apparatus 1 returns to Step S101.

As described above, in the first embodiment of the invention, according to the displacement amount detected by the tilt detecting unit 304, the display control unit 215e causes the display unit 210 to display the focus region where the optical system 301 comes into focus and/or the out-of-focus region where the optical system 301 becomes out-of-focus in the region of the live viewing image displayed by the display unit 210. As a result, even if the image shooting is performed while the optical axis of the optical system 301 is tilted, the user can intuitively recognize the focus region or out-of-focus region in the image region.

In the first embodiment of the invention, when the user does not want to perform the image shooting, the image shooting can be stopped by performing the tilt operation or focus operation of the lens unit 3.

In the first embodiment of the invention, when the focus position of the optical system 301 is fixed for a predetermined time as a determination result of the state determination unit 215c, the image shooting control unit 215d causes the image capturing apparatus 1 to perform the image shooting. Accordingly, the image shooting can easily be performed even if the user's hands are full of the manipulation of the lens unit 3.

In the first embodiment of the invention, the optical axis of the optical system 301 can be tilted in the direction orthogonal to the light receiving surface of the image capturing unit 201. Alternatively, for example, the optical axis of the optical system 301 may move while the angle formed by the optical axis of the optical system 301 and the light receiving surface of the image capturing unit 201 is kept constant.

In the first embodiment of the invention, the change in which the optical axis is tilted is mainly described. However, the first embodiment of the invention may be applied to a shift lens in which the optical axis changes in parallel.

Figure 17:
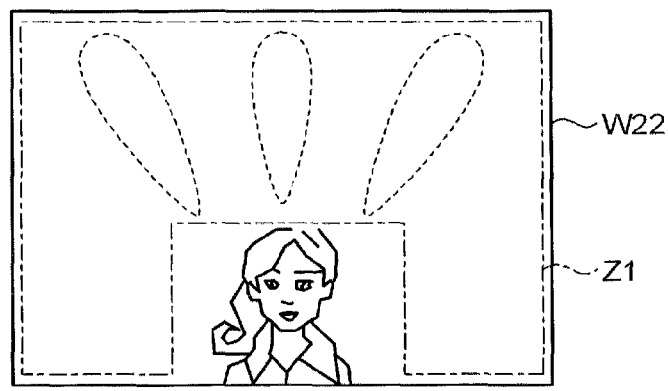
FIG. 17 is a view illustrating an example of the image displayed by the display unit of the image capturing apparatus of the first embodiment.
Figure 18:
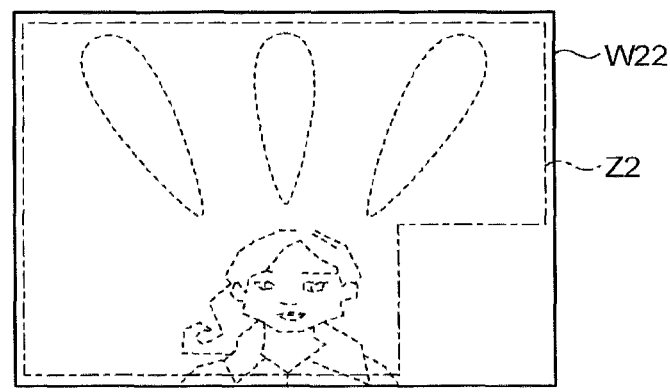
FIG. 18 is a view illustrating an example of the image displayed by the display unit of the image capturing apparatus of the first embodiment.

In the first embodiment of the invention, the display control unit 215e causes the display unit 210 to display the focus region of the optical system 301 in the rectangular frame. Alternatively, for example, the display control unit 215e may cause the display unit 210 to display the out-of-focus region of the optical system 301 such that the user visually recognizes the out-of-focus region from the live viewing image. FIGS. 17 and 18 illustrate examples of the image displayed by the display unit 210. As illustrated in FIGS. 17 and 18, according to the displacement amount in which the optical axis of the optical system 301 is displaced from the position in which the optical system 301 detected by the tilt detecting unit 304 and the light receiving surface of the image capturing unit 201 are orthogonal to each other, the display control unit 215e may cause the display unit 210 to display out-of-focus regions Z1 and Z2 of the optical system 301 in the region of the live viewing image displayed by the display unit 210 while the out-of-focus regions Z1 and Z2 are enhanced. Therefore, the user can intuitively recognize the out-of-focus region.

In the first embodiment of the invention, the display control unit 215e causes the display unit 210 to display the region corresponding to the focus region of the optical system 301 and/or the out-of-focus region of the optical system 301 in the frame. Alternatively, for example, the display control unit 215e may cause the display unit 210 to display the region corresponding to the focus region of the optical system 301 and/or the out-of-focus region of the optical system 301 while the region is enhanced by a color, an oblique line, or a mark.

Second Embodiment

A second embodiment of the invention will be described below. The image capturing apparatus of the second embodiment differs from that of the first embodiment in the configuration and the operation of the main body control unit. Therefore, the operation of the image capturing apparatus of the second embodiment will be described after the configuration of the main body control unit is described. In the second embodiment, the same component as the first embodiment will be described while designated by the same numeral.

Figure 19:
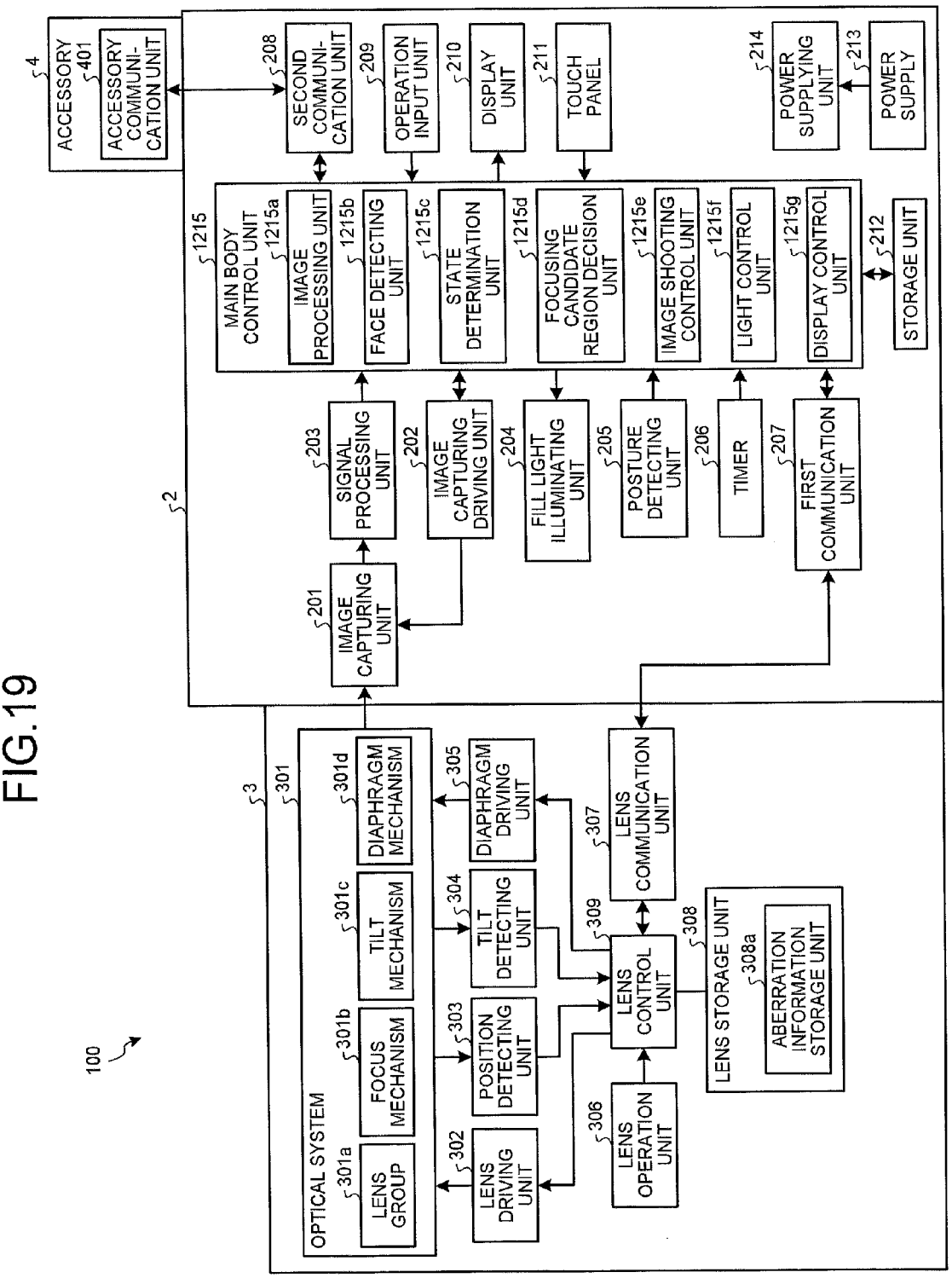
FIG. 19 is a block diagram illustrating a configuration of an image capturing apparatus according to a second embodiment of the invention.

FIG. 19 is a block diagram illustrating a configuration of the image capturing apparatus according to the second embodiment. An image capturing apparatus 100 of FIG. 19 is a digital single-lens reflex camera, and the image capturing apparatus 100 includes the main body 2 and the lens unit 3 that is detachably attached to the main body 2. Accessories 4 such as the electronic viewfinder (EVF) and the electronic flash can also be attached to the image capturing apparatus 100.

As illustrated in FIG. 19, a main body control unit 1215 includes a CPU (Central Processing Unit), for example. The main body control unit 1215 wholly controls the operation of the image capturing apparatus 100 by transferring the instruction or data corresponding to each unit of the image capturing apparatus 100 according to the instruction signal or the switch signal from the operation input unit 209 or the touch panel 211. The main body control unit 1215 includes an image processing unit 1215a, a face detecting unit 1215b, a state determination unit 1215c, a focusing candidate region decision unit 1215d, an image shooting control unit 1215e, a light control unit 1215f, and a display control unit 1215g.

The image processing unit 1215a performs various pieces of image processing to the image data input from the signal processing unit 203, and outputs the image data to the storage unit 212. Specifically, the image processing unit 1215a performs the pieces of image processing including at least the edge enhancement, the white balance, the color correction, and the gamma correction to the image data.

The face detecting unit 1215b detects the face of the person included in the image corresponding to the image data by the pattern matching. The face detecting unit 1215b may detect not only the human face but also faces of the dog, the cat, and the like. The face detecting unit 1215b may also detect the face of the person using a well-known technology other than the pattern matching.

The state determination unit 1215c determines the state of the lens unit 3 based on the information on the state of the lens unit 3, which is input from the first communication unit 207.

The focusing candidate region decision unit 1215d decides a candidate region (hereinafter referred to as a "focusing candidate region"), where the image capturing unit 201 performs focusing control, based on the determination result of the state determination unit 1215c.

The image shooting control unit 1215e performs the control to start the image shooting operation of the image capturing apparatus 100 when the still image release signal is input. As used herein, the image shooting operation of the image capturing apparatus 100 means an operation in which the signal processing unit 203 and the image processing unit 1215a perform predetermined pieces of processing to the image data, which is output from the image capturing unit 201 by the drive of the image capturing driving unit 202. The main body control unit 1215 records the image data to which the pieces of processing are performed in the storage unit 212. Alternatively, the image shooting control unit 1215e may perform the control to start the image shooting operation of the image capturing apparatus 1 according to the determination result of the state determination unit 1215c.

When the image capturing apparatus 100 performs the image shooting, the light control unit 1215f adjusts an illumination amount of fill light emitted from a fill light illuminating unit 204 based on the displacement amount of the lens unit 3 from a predetermined reference position.

The display control unit 1215g causes the display unit 210 to display the operation menu screen when the instruction signal is input from the menu switch 209e. The display control unit 1215g causes the display unit 210 to display the region corresponding to the focusing candidate region in the image capturing unit 201.

Figure 20:
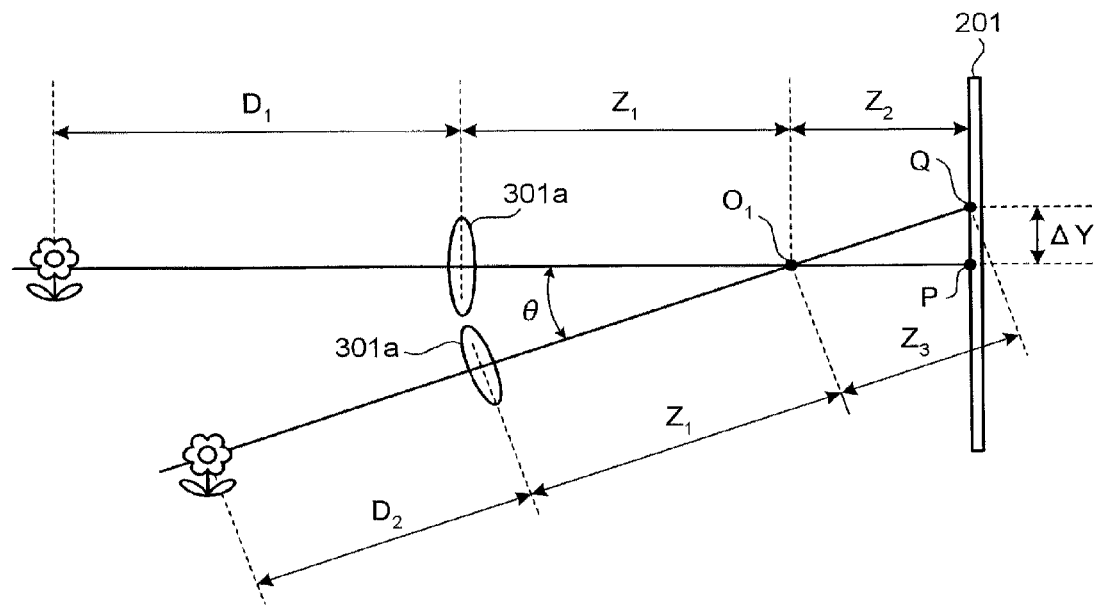
FIG. 20 is a view schematically illustrating a relationship between a tilt state of an optical system of the image capturing apparatus of the second embodiment and a candidate region of focusing control in an image capturing unit.
Figure 21:
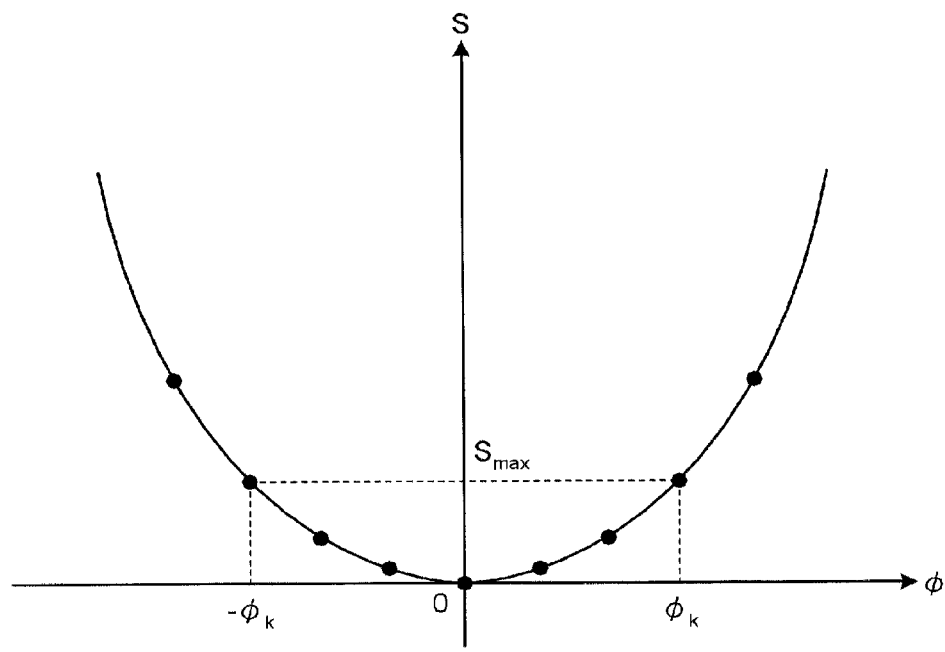
FIG. 21 is a view schematically illustrating a relationship between an aberration and an angle deviated from the optical axis of the optical system of the image capturing apparatus of the second embodiment.

When the optical system 301 is adapted, the focusing candidate region in the image capturing unit 201 changes according to the tilt angle θ from the initial state. FIG. 20 is a view schematically illustrating a relationship between a displacement of the optical system 301 from a reference position and the focusing candidate region in the image capturing unit 201. FIG. 21 illustrates the case in which a bringing-up amount $Z_1$ in the initial state is equal to a bringing-up amount $Z_1$ in a state (hereinafter referred to as a "tilt state") in which the optical system 301 is tiled in a plane parallel to the vertical direction by rotating the optical system 301 by the tilt angle θ. It is assumed that $Z_2$ is a distance on the optical axis between a point $O_1$ and the image capturing unit 201 when the optical system 301 is in the initial state, and it is assumed that $Z_3$ is a distance on the optical axis between the point $O_1$ and the image capturing unit 201 when the optical system 301 is in the tilt state. At this point, the following equation holds:

$$Z_3 = Z_2 \cdot \arccos \theta \quad (1)$$

Assuming that $D_1$ is a distance (hereinafter referred to as a focusing distance) from the optical system 301 to a focusing position when the optical system 301 is focused on the subject located on the optical axis in the initial state, the following equation holds:

$$D_1 = \alpha(Z_1 + Z_2) \quad (2)$$

Where α is a positive constant that is decided according to a characteristic of the lens group 301a. On the other hand, a focusing distance $D_2$ in the tilt state is given by the following equation:

$$D_2 = D_1 \cdot (Z_1 + Z_2)/(Z_1 + Z_3) \quad (3)$$

Where $D_1 > D_2$ because of $Z_2 > Z_3$. In the lens unit 3, the focusing distance varies by changing the tilt angle θ even if the bringing-up amount is not changed. Specifically, in the lens unit 3, when the bringing-up amount is kept constant, the focusing distance is shortened with increasing tilt angle θ, and the lens unit 3 can be focused on the subject located closer to the lens unit 3. When the lens unit 3 having the above characteristic is adapted, it is necessary to correct the focusing distance, and it is necessary to adjust the illumination amount of the fill light emitted from the fill light illuminating unit 204 according to the focusing distance. In the image capturing apparatus 100, the light control unit 1215f adjusts the illumination amount of the fill light based on the state of the lens unit 3 during the image shooting.

Referring to FIG. 20, using the tilt angle θ, a distance ΔY in the vertical direction between an intersection point P of the optical axis of the optical system 301 in the initial state and the image capturing unit 201 and an intersection point Q of the optical axis of the optical system 301 in the tilt state and the image capturing unit 201 is given by the following equation:

$$\Delta Y = Z_2 \tan \theta \quad (4)$$

FIG. 21 is a view schematically illustrating a relationship between an aberration S and a deviation angle φ from the optical axis of the optical system 301. As illustrated in FIG. 21, the aberration S is increased with increasing deviation angle φ. In the second embodiment, in order to decide the focusing candidate region suitable for automatic focusing processing, an upper limit $S_{max}$ of the aberration is previously set, and a tolerance $\phi_k$ of the deviation angle φ is decided so as to satisfy the upper limit $S_{max}$. For example, $S_{max}$ may be set to 0.2 mm and $\phi_k$ may be set to $-10° < \phi_k < 10°$. Therefore, in the image capturing unit 201, the focusing range in the vertical direction is set to $\Delta Y \pm \Delta Y_k$. At this point, $\Delta Y_k$ is given by the following equation:

$$\Delta Y_k = Z_2 \cdot \tan|\phi_k| \quad (5)$$

Although only the vertical direction of the image capturing apparatus 100 is described above, the focusing candidate region decision unit 1215d can decide the rectangular focusing candidate region by similarly setting the focusing range in the horizontal direction of the image capturing apparatus 100.

A lens unit other than the lens unit 3 that is of the tilt lens can be attached to the image capturing apparatus 100 having the above configuration. Hereinafter, the lens unit that can be attached to the image capturing apparatus 100 is collectively referred to as a "lens unit 3G". It is assumed that the lens unit 3G includes at least the lens communication unit 307 and the lens control unit 309.

Figure 22:
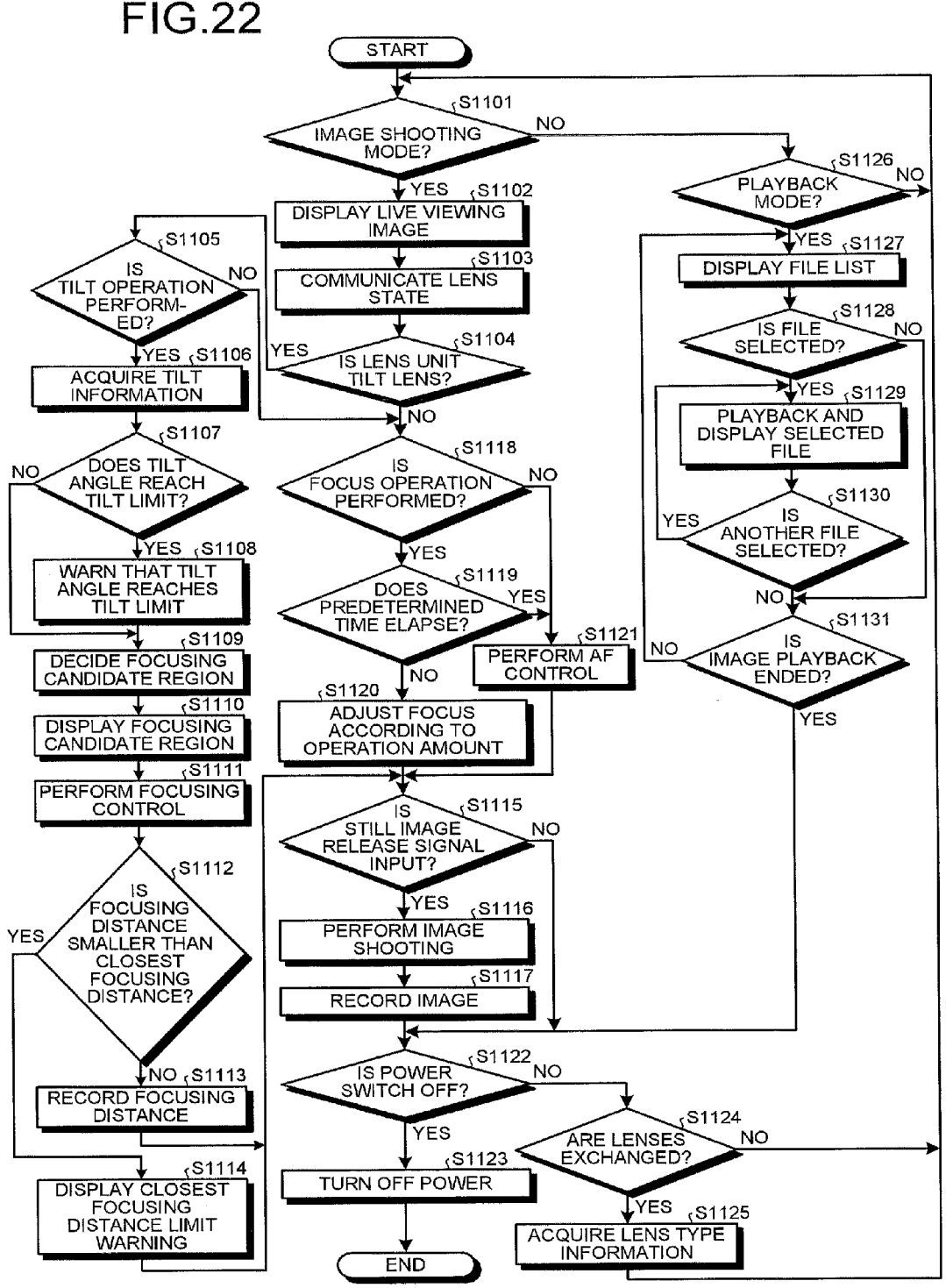
FIG. 22 is a flowchart illustrating an outline of processing performed by the image capturing apparatus of the second embodiment.

The operation performed by the image capturing apparatus 100 having the above configuration will be described below. FIG. 22 is a flowchart illustrating an outline of processing performed by the image capturing apparatus 100.

In FIG. 22, the case in which the image capturing apparatus 100 is put in the image shooting mode (Yes in Step S1101) will be described. The display control unit 1215g causes the display unit 210 to display the live viewing image (Step S1102). The lens control unit 309 communicates the lens state of the lens unit 3G to the main body control unit 215 (Step S1103).

The main body control unit 1215 determines whether the lens unit 30 attached to the main body 2 is the tilt lens based on the signal input from the lens control unit 309 (Step S1104). When the lens unit 3G attached to the main body 2 is the tilt lens (Yes in Step S1104), the image capturing apparatus 100 goes to Step S1105. On the other hand, when the lens unit 3G attached to the main body 2 is not the tilt lens (No in Step S1104), the image capturing apparatus 100 goes to Step S1118.

The case in which the lens unit 3G attached to the main body 2 is the tilt lens (Yes in Step S1104) will be described. Hereinafter, the lens unit 3G is referred to as the lens unit 3 in pieces of processing in Steps S1105 to S1110 in the case in which the lens unit 3G is the tilt lens. The state determination unit 1215c determines whether the tilt operation to tilt the lens unit 3 is performed (Step S1105). Specifically, the state determination unit 1215c determines whether the tilt detecting unit 304 of the lens unit 3 detects the tilt of the optical system 301. When the tilt operation of the lens unit 3 is performed (Yes in Step S1105), the lens control unit 309 acquires the tilt information including the tilt amount as the displacement amount, which is detected by the tilt detecting unit 304, from the tilt detecting unit 304 (Step S1106). On the other hand, when the tilt operation of the lens unit 3 is not performed (No in Step S1105), the image capturing apparatus 100 goes to Step S1118.

Figure 23:
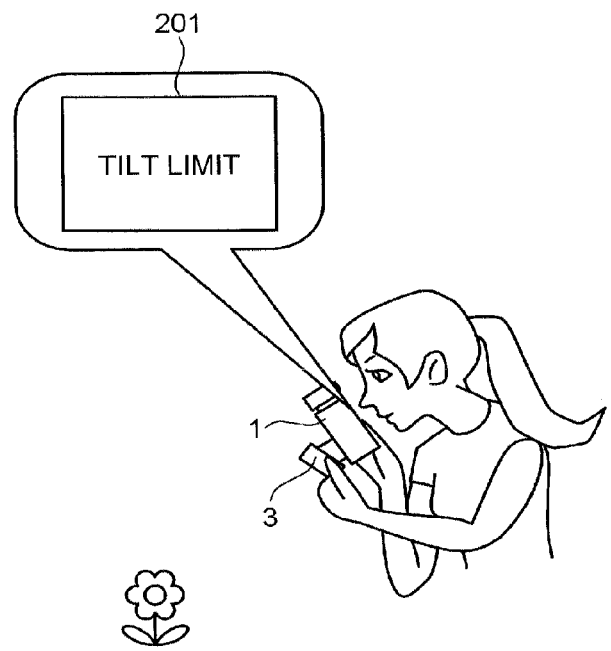
FIG. 23 is a view illustrating an example of displacement limit warning information displayed by a display unit of the image capturing apparatus of the second embodiment.

After Step S1106, the lens control unit 309 determines whether the tilt of the lens unit 3, namely, the tilt angle reaches a limit (displacement limit) by referring to the lens storage unit 308 (Step S1107). When the tilt of the lens unit 3 reaches the limit as a determination result (Yes in Step S1107), the lens control unit 309 transmits a signal indicating that the tilt of the lens unit 3 reaches the limit to the main body control unit 1215. The display control unit 1215g causes the display unit 210 to display information (displacement limit warning information) announcing that the tilt of the lens unit 3 reaches the limit based on the signal received from the lens control unit 309 (Step S1108). FIG. 23 is a view illustrating an example of the displacement limit warning information displayed by the display unit 210. In FIG. 23, a message of "tilt limit" is displayed on the display unit 210. Informing the user of the tracking limits of various sensors or mechanisms can prevent a focusing impossible state, in which the image formation is not obtained on the optical axis, and prevent the user from performing the impossible manipulation.

When the tilt of the lens unit 3 does not reach the limit as a determination result of the lens control unit 309 (No in Step S1107), the image capturing apparatus 100 goes to Step S1109.

Figure 24:
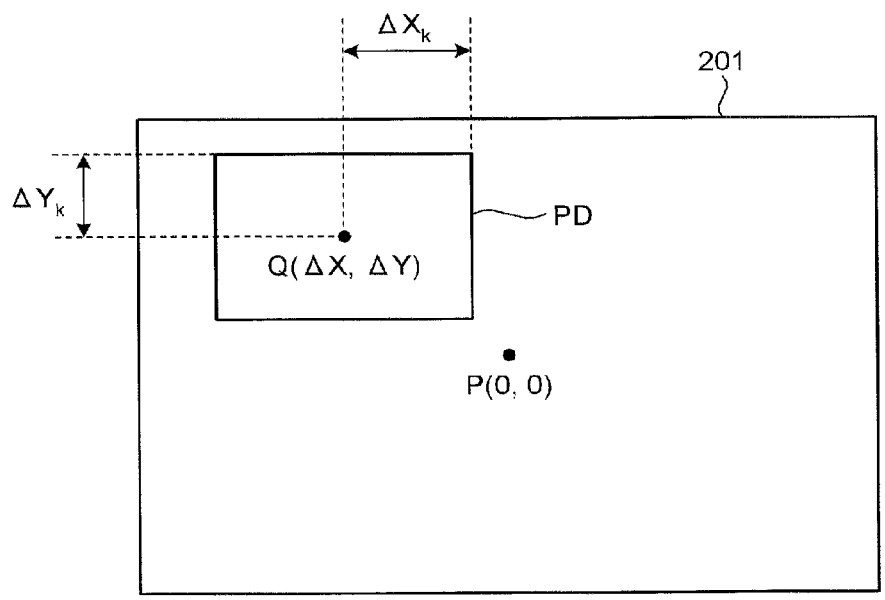
FIG. 24 is a view schematically illustrating the candidate region of the focusing control in the image capturing unit of the image capturing apparatus of the second embodiment.

The focusing candidate region decision unit 1215d decides the focusing candidate region in the image capturing unit 201 (Step S1109). At this point, for example, the focusing candidate region decision unit 1215d decides the focusing candidate region around the point Q of the image capturing unit 201 using the equations (1) to (5). FIG. 24 is a view schematically illustrating the focusing candidate region in the image capturing unit 201. A focusing candidate region PD of FIG. 24 is given by the following equation:

$$PD=\{(X,Y)|\Delta X-\Delta X_k<X<\Delta X+\Delta X_k, \Delta Y-\Delta Y_k<Y<\Delta Y+\Delta Y_k\}$$

Where $\Delta X_k$ is obtained in the same way as $\Delta Y_k$ (see equation (5)).

Figure 25:
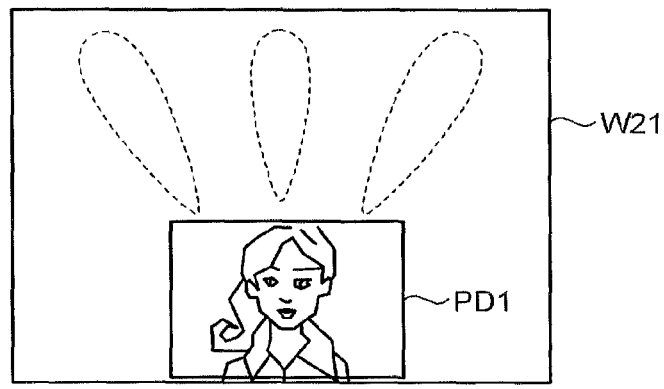
FIG. 25 is a view illustrating an example of the candidate region of the focusing control displayed by the display unit of the image capturing apparatus of the second embodiment.

Then the display control unit 1215g causes the display unit 210 to display the focusing candidate region decided by the focusing candidate region decision unit 1215d while the focusing candidate region is superposed on the live viewing image (Step S1110). FIG. 25 is a view illustrating an example of the focusing candidate region displayed by the display unit 210. Specifically, FIG. 25 illustrates a display example in the case in which the optical axis of the optical system 301 is tilted upward relative to the light receiving surface of the image capturing unit 201. The display unit 210 displays a focusing candidate region PD1 while the focusing candidate region PD1 is superposed on a live viewing image W21. Therefore, the user can correctly recognize the focusing candidate region in the image.

After Step S1110, using the image signal in the focusing candidate region, the main body control unit 1215 and the lens control unit 309 automatically performs the focusing control in cooperation with each other (Step S1111). In the second embodiment, the image capturing apparatus 100 makes a focusing determination only in the focusing candidate region. Step S1111 may be performed in parallel to Step S1110.

The lens control unit 309 determines whether the focusing distance is smaller than the closest focusing distance by referring to the lens storage unit 308 (Step S1112). In the second embodiment, the bringing-up amount of the optical system 301 corresponding to the closest focusing distance is set smaller than the bringing-up amount of the mechanical limit as long as the tilt of the lens unit 3 does not reach the limit.

Figure 26:
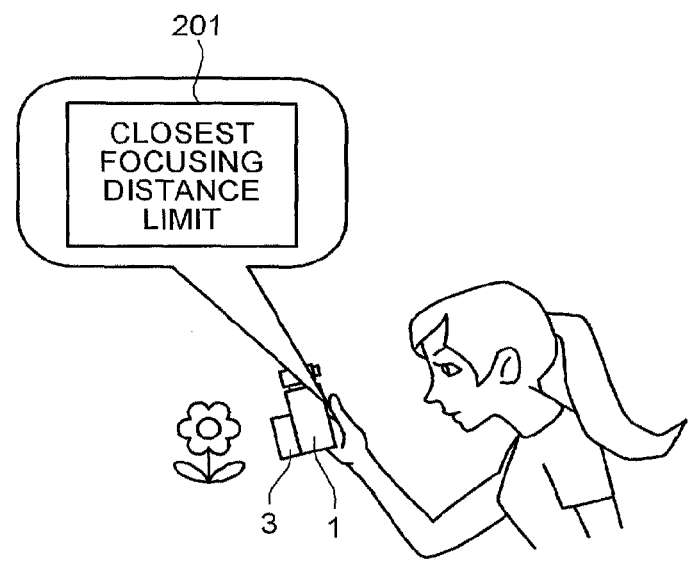
FIG. 26 is a view illustrating an example of closest focusing distance limit warning information displayed by the display unit of the image capturing apparatus of the second embodiment.

When the focusing distance is smaller than the closest focusing distance as a determination result of the lens control unit 309 (Yes in Step S1112), the lens control unit 309 transmits the signal indicating that the focusing distance is smaller than the closest focusing distance to the main body control unit 1215. The main body control unit 1215 that receives the signal causes the display control unit 1215g to display the closest focusing distance limit warning information indicating that the focusing position is closer than the closest focusing distance limit on the display unit 210 (Step S1114). FIG. 26 is a view illustrating an example of the closest focusing distance limit warning information displayed by the display unit 210. In FIG. 26, a message of "closest focusing distance limit" is displayed on the display unit 210. Therefore, the user can prevent from wasting such useless labor or time that the user tries to perform the image shooting in the out-of-focus distance. As a result, the user can perform the image shooting by the quick determination without losing a shutter chance.

On the other hand, when the focusing distance is equal to or larger than the closest focusing distance as a determination result of the lens control unit 309 (No in Step S1112), the main body control unit 1215 records the focusing distance in the storage unit 212 while the focusing distance is associated with the tilt angle (Step S1113).

After Step S1113 or S1114, when the release switch 209b is pressed to input the still image release signal (Yes in Step S1115), the image capturing apparatus 100 performs the image shooting under the control of the image shooting control unit 1215e (Step S1116). The main body control unit 1215 records the image data acquired by the image shooting in the storage unit 212 (Step S1117). When the image capturing apparatus 100 is put in an automatic fill light emitting mode, the main body control unit 1215 controls the fill light illuminating unit 204 to emit the light according to brightness in a visual field region of the optical system 301. At this point, when the lens unit 3G is the tilt lens, and when the focusing distance is equal to or larger than the closest focusing distance as a determination result in Step S1112, the light control unit 1215f adjusts the illumination amount according to the focusing distance and the tilt angle of the lens unit 3, which are stored in the storage unit 212.

When the still image release signal is not input through the release switch 209b (No in Step S1115), the image capturing apparatus 100 goes to Step S1122 described below.

The case in which the lens unit 3G attached to the main body 2 is not the tilt lens (No in Step S1104) will be described. When the focus operation to adjust the focus of the lens unit 3 is performed (Yes in Step S1118), and when the predetermined time (for example, 3 seconds) does not elapse since the focus operation is performed (No in Step S1119), the lens control unit 309 adjusts the focus of the lens unit 3G according to the operation amount of the focus operation (Step S1120). On the other hand, when the focus operation is performed (Yes in Step S1118), and when the predetermined time (for example, 3 seconds) elapses since the focus operation is performed (Yes in Step S1119), the lens control unit 309 performs the AF control of the lens unit 3G in cooperation with the main body control unit 1215 (Step S1121). When the focus operation is not performed (No in Step S1118), the image capturing apparatus 100 goes to Step S1121. After Step S1120 or S1121, the image capturing apparatus 100 goes to Step S1115.

When the power switch 209a is pressed (Yes in Step S1122), the main body control unit 1215 performs the control to turn off the power supply (Step S1123). Then the image capturing apparatus 100 ends the series of pieces of processing.

When the power switch 209a is not pressed (No in Step S1122), and when the lens unit 3G is replaced with another lens unit 3G (Yes in Step S1124), the main body control unit 1215 acquires the lens type information from the newly-attached lens unit 3G (Step S1125). Then, the image capturing apparatus 100 returns to Step S1101. On the other hand, when the power switch 209a is not pressed (No in Step S1122), and when the lens unit 3G is not replaced with another lens unit 3G (No in Step S1124), the image capturing apparatus 100 returns to Step S1101.

The case in which the image capturing apparatus 100 is not put in the image shooting mode (No in Step S1101) will be described below. When the image capturing apparatus 100 is put in the playback mode (Yes in Step S1126), the display control unit 1215g causes the display unit 210 to display the file list (Step S1127).

When a file that is displayed while enlarged is selected through the operation input unit 209 or the touch panel 211 (Yes in Step S1128), the display control unit 1215g causes the display unit 210 to perform the playback display of the selected file (Step S1129).

When another image file is newly selected (Yes in Step S1130), the image capturing apparatus 100 returns to Step S1129. On the other hand, when another image file is not selected (No in Step S1130), the image capturing apparatus 100 goes to Step S1131.

When the instruction to end the image playback is input though the operation input unit 209 or the touch panel 211 (Yes in Step S1131), the image capturing apparatus 100 goes to Step S1122. On the other hand, when the end instruction is not input (No in Step S1131), the image capturing apparatus 100 returns to Step S1127.

When the file is not selected (No in Step S1128), the image capturing apparatus 100 goes to Step S1131.

When the image capturing apparatus 100 is not put in the playback mode (No in Step S1126), the image capturing apparatus 100 returns to Step S1101.

As described above, in the second embodiment of the invention, the candidate region of the focusing control is decided in the image capturing unit based on the displacement amount of the optical axis of the optical system having the lens movement function from the reference position, and the region corresponding to the candidate region is displayed on the display unit. Therefore, the automatic focusing can easily be performed while the optical system has the lens movement function, and the user can correctly recognize the region of the focusing target.

In the second embodiment of the invention, the displacement limit warning information or the closest focusing distance limit warning information is displayed on the display unit according to the state of the lens unit (optical system). Therefore, the user who has only a usage experience of the normal lens having no tilt function can learn how to use the tilt-function lens and get used to the tilt-function lens.

In the second embodiment of the invention, the optical axis of the optical system 301 can be tilted relative to the direction orthogonal to the light receiving surface of the image capturing unit 201. Alternatively, for example, the optical axis of the optical system 301 may move while the angle formed by the optical axis of the optical system 301 and the light, receiving surface of the image capturing unit 201 is kept constant.

Third Embodiment

Figure 27:
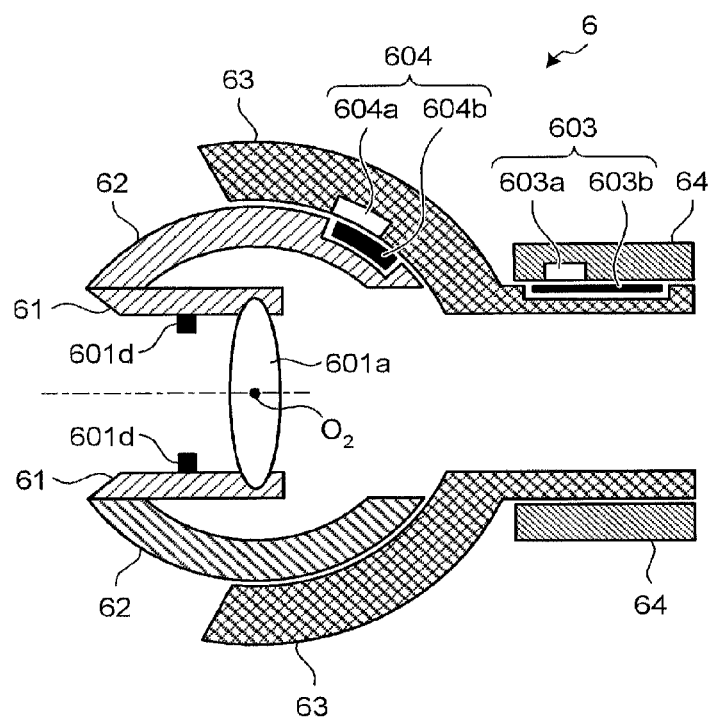
FIG. 27 is a view illustrating a configuration of a main part of a lens unit of an image capturing apparatus according to a third embodiment of the invention.

FIG. 27 is a view illustrating a configuration of a main part of a lens unit of an image capturing apparatus according to a third embodiment of the invention. A lens unit 6 of FIG. 27 includes a first frame 61 that retains a lens group 601a and a diaphragm mechanism 601d, a second frame 62 that retains the first frame 61, a third frame 63 that retains the second frame 62 while the second frame 62 can tilt about a center point $O_2$, and a fourth frame 64 that retains the third frame 63 while the third frame 63 can move in the front-back direction. A tilt detecting unit 604 is provided inside the third frame 63, and a position detecting unit 603 is provided inside the fourth frame 64. Similarly to the tilt detecting unit 304 of the lens unit 3, the tilt detecting unit 604 includes a photo interrupter 604a and a reflection member 604b. Similarly to the position detecting unit 303 of the lens unit 3, the position detecting unit 603 includes a photo interrupter 603a and a reflection member 603b. In the second embodiment, the lens group 601a includes one lens. Alternatively, the lens group 601a may include plural lenses.

Similarly to the optical system 301 of the lens unit 3, the optical system 601 of the lens unit 6 includes a focus mechanism 601b that corresponds to the focus mechanism 301b and a tilt mechanism 601c that corresponds to the tilt mechanism 301c in addition to the lens group 601a and the diaphragm mechanism 601d. Similarly to the lens unit 3, the lens unit 6 includes the lens driving unit 302, the diaphragm driving unit 305, the lens operation unit 306, the lens communication unit 307, the lens storage unit 308, and the lens control unit 309.

Figure 28:
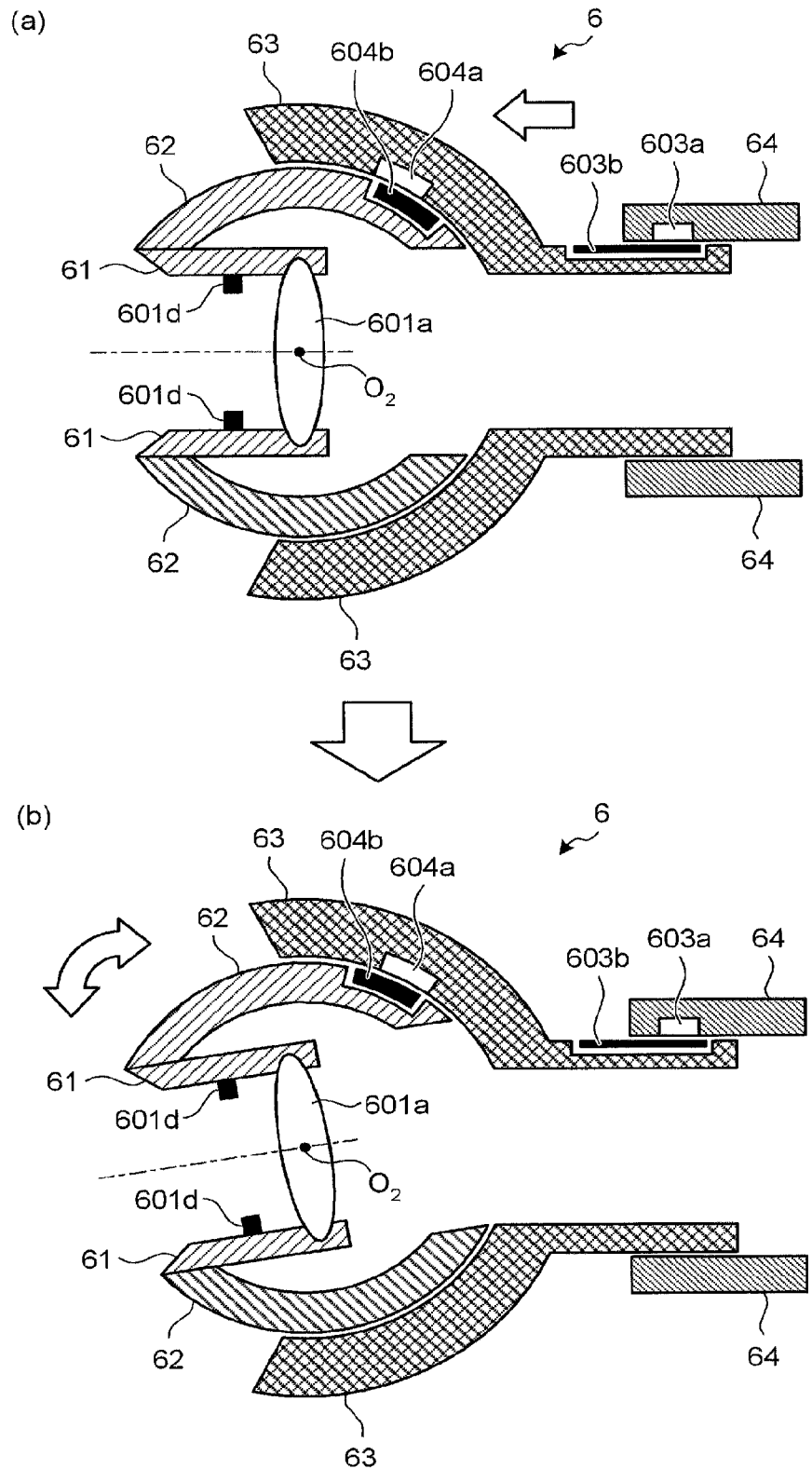
FIG. 28 is a view schematically explaining an operation of the lens unit of the image capturing apparatus of the third embodiment.

An operation of the lens unit 6 having the above configuration will be described below. FIG. 28 is a view schematically explaining the operation of the lens unit 6. As illustrated in FIG. 28, in the lens unit 6, the focus is adjusted by moving the first frame 61 and the second frame 62 in the front-back direction (FIG. 28(a)). The first frame 61 and the second frame 62 can automatically be moved under the control of the lens control unit 309, or the user can manipulate the lens operation unit 306 to move the first frame 61 and the second frame 62. The user manipulates the lens barrel of the lens unit 6 to tilt the first frame 61 and the second frame 62, thereby displacing the optical axis of the optical system 601 (FIG. 28(b)).

Figure 29:
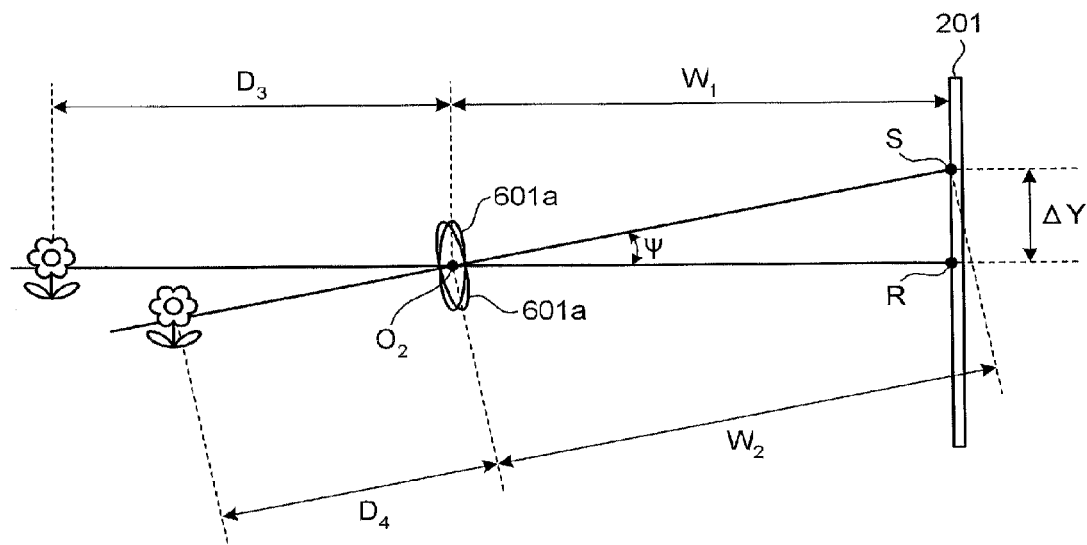
FIG. 29 is a view schematically illustrating a relationship between a tilt state of an optical system of the image capturing apparatus of the third embodiment and a candidate region of focusing control in an image capturing unit.

FIG. 29 is a view schematically illustrating a relationship between the tilt state of the optical system 601 and the focusing candidate region of the image capturing unit 201. Referring to FIG. 29, the following equation holds between the bringing-up amount $W_1$ in the initial state and the bringing-up amount $W_2$ in the tilt state in which the lens group 601a is tilted by a tilt angle:

$$W_2 = W_1 \cdot \arccos \phi \tag{6}$$

Assuming that $D_3$ is a focusing distance to the focusing position from the lens group 601a in the case in which the optical system 601 is focused on the subject located on the optical axis of the optical system 601 in the initial state, the following equation holds:

$$D_3 = \beta W_1 \tag{7}$$

where $\beta$ is a positive constant that is decided according to a characteristic of the lens group 601a. On the other hand, a focusing distance $D_4$ in the tilt state is given by the following equation:

$$D_4 = D_3 \cdot W_1 / W_2 \tag{8}$$

Accordingly, in the third embodiment, the focusing distance $D_4$ in the tilt state is smaller than the focusing distance $D_3$ in the initial state ($D_3$>$D_4$). In the lens unit 6, when the bringing-up amount is kept constant, the focusing distance is shortened with increasing tilt angle φ, and the lens unit 6 can be focused on the subject located closer to the lens unit 6.

A distance ΔY in the vertical direction between an intersection point R of the optical axis of the optical system 601 in the initial state and the image capturing unit 201 and an intersection point S of the optical axis of the optical system 601 in the tilt state and the image capturing unit 201 is given by the following equation:

$$\Delta Y = W_1 \cdot \tan \phi \qquad (9)$$

When the lens unit 6 having the above configuration is adapted, the focusing candidate region can be decided similarly to the second embodiment.

As described above, in the third embodiment of the invention, the automatic focusing can easily be performed while the optical system has the lens movement function, and the user can correctly recognize the region of the focusing target.

First Modification of Third Embodiment

Figure 30:
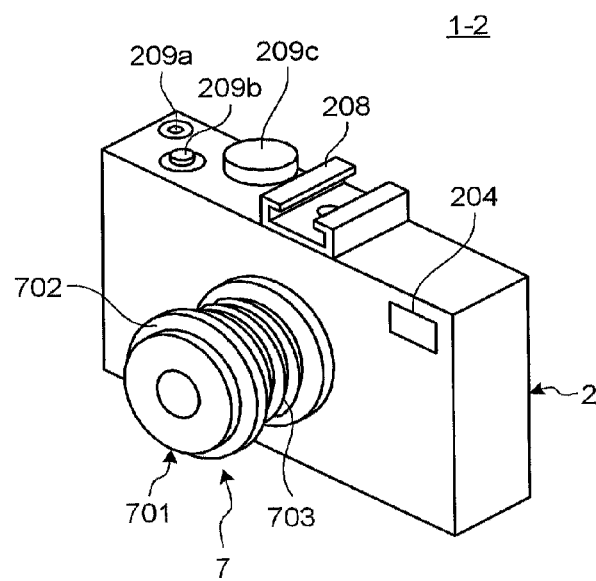
FIG. 30 is a view illustrating a configuration on a front side of the image capturing apparatus of the third embodiment.

FIG. 30 is a view illustrating a configuration on a front side of the image capturing apparatus of another embodiment of the invention. An image capturing apparatus 1-2 of FIG. 30 includes the main body 2 and a lens unit 7 that is detachably attached to the main body 2. The lens unit 7 includes an optical system 701, an optical system retaining unit 702 that retains the optical system 701, and a bellows coupling unit 703 that retains the optical system retaining unit 702 while the optical system retaining unit 702 can proceed and retreat in the front-back direction relative to a proximal end portion and couples the optical system retaining unit 702 while the optical system retaining unit 702 can tilt all-around.

When the lens unit 7 having the above configuration is adapted, the user grasps the optical system retaining unit 702 and the user fixes the optical system 701 while orienting the optical system 701 toward the desired direction. Therefore, the user can perform the focusing while deciding the visual field. A fixing mechanism that fixes the coupling state of the coupling unit 703 can also be provided in the lens unit 7.

The use of the lens unit 7 having the above configuration can change the optical axis of the optical system 301 relative to the direction orthogonal to the light receiving surface of the image capturing unit 201, and the same effect as the first to third embodiments is obtained.

In the first to third embodiments of the invention, the change in which the optical axis is tilted is mainly described. However, the invention may be applied to a shift lens in which the optical axis changes in parallel.

Fourth Embodiment

A fourth embodiment of the invention will be described below. The image capturing apparatus of the fourth embodiment differs from that of the first to third embodiments in the configuration and the operation of the main body control unit. Therefore, the operation of the image capturing apparatus of the fourth embodiment will be described after the configuration of the main body control unit is described. In the fourth embodiment, the same component as the first embodiment will be described while designated by the same numeral.

Figure 31:
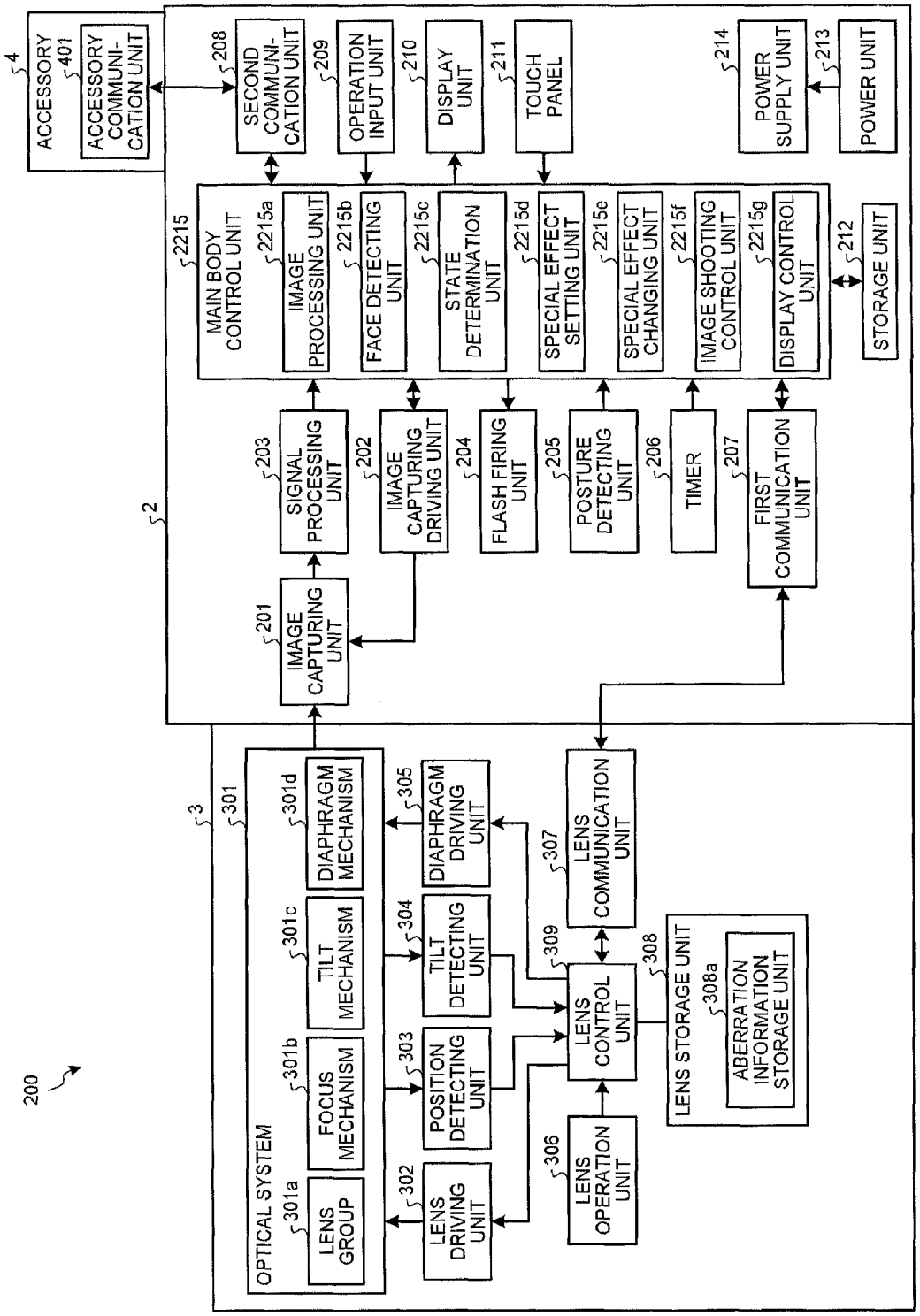
FIG. 31 is a block diagram illustrating a configuration of the image capturing apparatus according to a fourth embodiment of the invention.

FIG. 31 is a block diagram illustrating a configuration of the image capturing apparatus according to the fourth embodiment. An image capturing apparatus 200 of FIG. 31 is a digital single-lens reflex camera, and the image capturing apparatus 200 includes the main body 2 and the lens unit 3 that is detachably attached to the main body 2. Accessories 4 such as the electronic viewfinder (EVF), the electronic flash, and a communication unit that conducts communication through the Internet can also be attached to the image capturing apparatus 1.

As illustrated in FIG. 31, a main body control unit 2215 includes a CPU (Central Processing Unit), for example. The main body control unit 2215 wholly controls the operation of the image capturing apparatus 200 by transferring the instruction or data corresponding to each unit of the image capturing apparatus 200 according to the instruction signal or the switch signal from the operation input unit 209 or the touch panel 211. The main body control unit 2215 includes an image processing unit 2215a, a face detecting unit 2215b, a state determination unit 2215c, a special effect setting unit 2215d, a special effect changing unit 2215e, an image shooting control unit 2215f, and a display control unit 2215g.

The image processing unit 2215a performs various pieces of image processing to the image data input from the signal processing unit 203, and outputs the image data to the storage unit 212. Specifically, the image processing unit 2215a performs the pieces of image processing including at least the edge enhancement, the white balance, the color correction, and the gamma correction to the image data. The image processing unit 2215a performs special effect processing, in which a visual effect is generated by a combination of plural pieces of image processing, to the image data.

The face detecting unit 2215b detects the face of the person included in the image corresponding to the image data by the pattern matching. The face detecting unit 2215b may detect not only the human face but also faces of the dog, the cat, and the like. The face detecting unit 2215b may also detect the face of the person using a well-known technology other than the pattern matching.

The state determination unit 2215c determines the state of the lens unit 3 based on the information on the state of the lens unit 3, which is input from the first communication unit 207.

The special effect setting unit 2215d sets processing that should be performed by the image processing unit 2215a in response to the instruction signal, which is input by the operation input unit 209 to instruct a content of special effect processing.

The special effect changing unit 2215e changes the content of the special effect processing set by the special effect setting unit 2215d. Specifically, the special effect changing unit 2215e changes the content of the special effect processing, which is set by the special effect setting unit 2215d, according to the determination result of the state determination unit 2215c.

The image shooting control unit 2215f performs control to start the image shooting operation of the image capturing apparatus 200 when the still image release signal is input. As used herein, the image shooting operation of the image capturing apparatus 200 means an operation in which the signal processing unit 203 and the image processing unit 2215a perform predetermined pieces of processing to the image data, which is output from the image capturing unit 201 by the drive of the image capturing driving unit 202. The main body control unit 2215 records the image data to which the pieces of processing are performed in the storage unit 212. Alternatively, the image shooting control unit 2215f may perform the control to start the image shooting operation of the image capturing apparatus 200 according to the determination result of the state determination unit 2215c.

The display control unit 2215g causes the display unit 210 to display the operation menu screen when the instruction signal is input from the menu switch 209e. The display control unit 2215g causes the display unit 210 to display the region where the focus of the optical system 301 is automatically adjusted.

The special effect processing performed by the image processing unit 2215a will be described below. In the fourth embodiment, the image processing unit 2215a performs toy photo, diorama, and fantastic focus as the special effect processing.

The toy photo is special effect processing in which a sense of the past or a sense of a memory is expressed by performing a shading effect to the surroundings of the image. In the toy photo, different image processing is performed according to the position in the image. Examples of the pieces of image processing combined in the toy photo include white balance processing, contrast processing, shading processing, and hue and chroma processing.

The diorama is special effect processing in which a sense of toy or an artificial-looking sense is expressed by performing an extreme out-of-focus effect to the surroundings of the screen. In the diorama, different pieces of image processing are performed according to the position in the image. Examples of the pieces of image processing combined in the diorama include the hue and chroma processing, the contrast processing, blurring processing, and synthetic processing.

The fantastic focus is special effect processing in which, while a sense of air is expressed in a soft tone, the subject is beautifully and fantastically expressed so as to be surrounded by happy light while a detail of the subject is left. In the fantastic focus, the image processing is evenly performed to the whole image. Examples of the pieces of image processing combined in the fantastic focus include tone curve processing, the blurring processing, and the synthetic processing.

Figure 32:
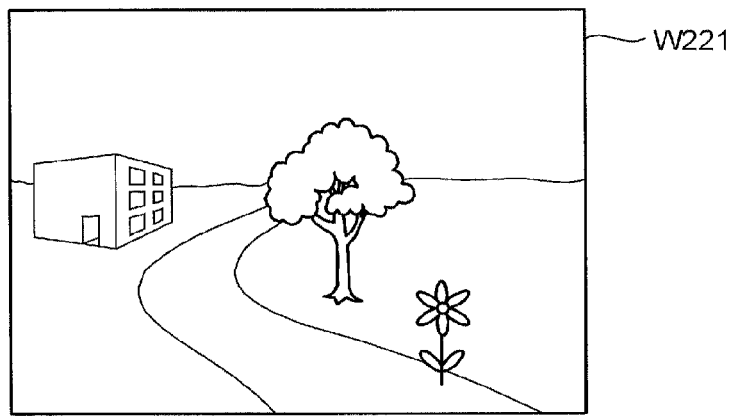
FIG. 32 is a view illustrating an example of an image corresponding to image data that is captured by the image capturing apparatus of the fourth embodiment provided with a normal standard lens.
Figure 33:
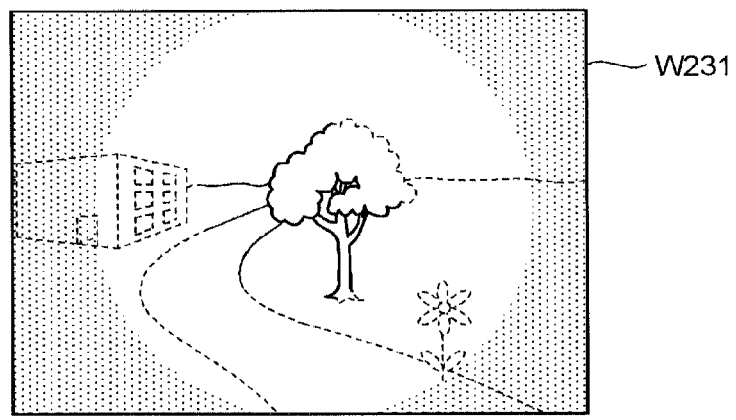
FIG. 33 is a view illustrating an example of an image in which an image processing unit performs toy photo while the image capturing apparatus of the fourth embodiment is provided with a lens unit.
Figure 34:
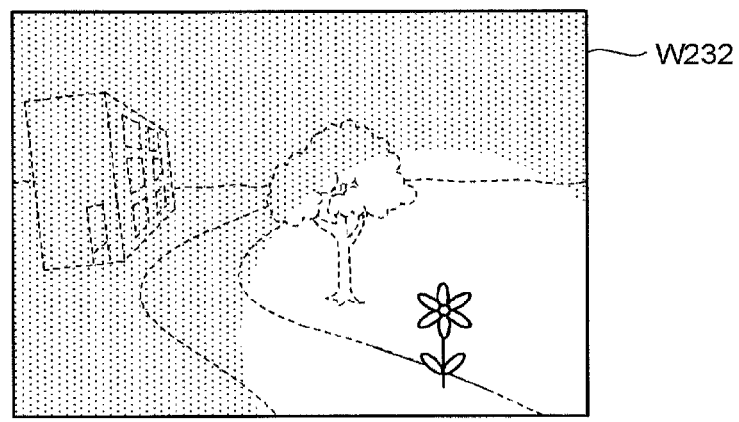
FIG. 34 is a view illustrating an example of the image in which the image processing unit performs toy photo while the image capturing apparatus of the fourth embodiment is provided with the lens unit.

The image in which the image processing unit 2215a performs the special effect processing to the image data while the image capturing apparatus is provided with the lens unit 3 will be described below. FIG. 32 is a view illustrating an example of the image corresponding to the image data that is captured by the image capturing apparatus provided with a normal standard lens unit. FIGS. 33 and 34 are views illustrating an example of the image in which the image processing unit 2215a performs the toy photo while the image capturing apparatus is provided with the lens unit 3. An image W231 of FIG. 33 is one in which the image processing unit 2215a performs the toy photo to the image data, which is captured using the lens group 301a in the initial state while the lens group 301a is focused on the center of the image. An image W232 of FIG. 34 is one in which the image processing unit 2215a performs the toy photo to the image data whose setting content is changed by the special effect changing unit 2215e to the image data, which is captured while the lens group 301a is tilted from the initial state to focus the lens group 301a on a flower of the subject. The tree and the flower, which are of the subjects, are located in the substantially same position distant from the lens group 301a.

Compared with an image W221 of FIG. 32, the shading effect (expressed by dots) is performed to the images W231 and W232. When compared the image W231 with the image W232, although the out-of-focus region (expressed by broken lines) is radially spread from the focus region (expressed by solid lines) in both the images W231 and W232, the out-of-focus amount (aberration) is increased with increasing distance from the focus region.

In the case in which the image shooting is performed under a situation of FIG. 33 while the lens group 301a is tilted from the initial state to focus the lens group 301a on the flower of the subject, the region that becomes dark by the shading effect and the focus region partially overlap each other when the image processing unit 2215a performs the toy photo as the special effect processing. Therefore, the focus region is cancelled by the region of the shading effect. Therefore, in the fourth embodiment, the special effect changing unit 2215e changes the setting content of the special effect processing, which is set by the special effect setting unit 2215d, according to the tilt of the lens group 301a. Specifically, when the image processing unit 2215a performs the toy photo as the special effect processing, the special effect changing unit 2215e changes the position in which the shading processing is performed in the image according to the displacement amount of the lens group 301a (for example, see the image W232 of FIG. 34).

Figure 35:
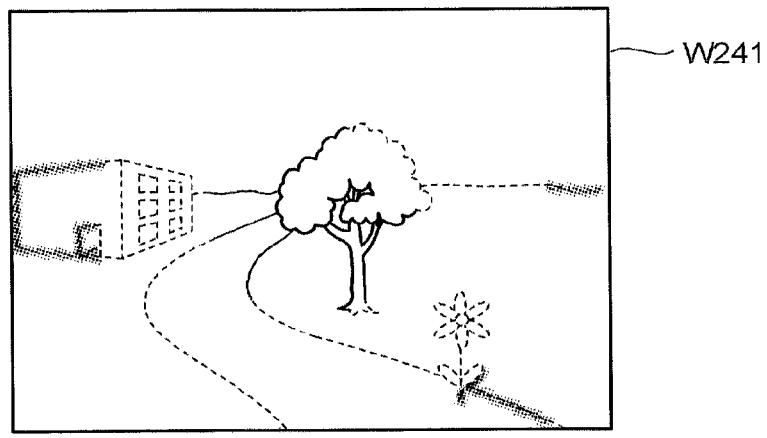
FIG. 35 is a view illustrating an example of an image in which the image processing unit performs diorama while the image capturing apparatus of the fourth embodiment is provided with the lens unit.
Figure 36:
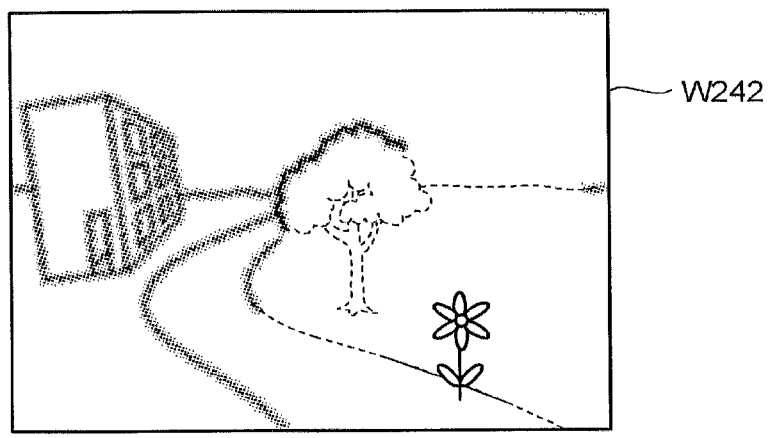
FIG. 36 is a view illustrating an example of the image in which the image processing unit performs diorama while the image capturing apparatus of the fourth embodiment is provided with the lens unit.

FIGS. 35 and 36 are views illustrating an example of the image in which the image processing unit 2215a performs the diorama as the special effect processing while the image capturing apparatus is provided with the lens unit 3. An image W241 of FIG. 35 is one in which the image processing unit 2215a performs the diorama to the image data, which is captured using the lens group 301a in the initial state while the lens group 301a is focused on the center of the image. An image W242 of FIG. 36 is one in which the image processing unit 2215a performs the diorama to the image data whose setting content is changed by the special effect changing unit 2215e to the image data, which is captured while the lens group 301a is tilted from the initial state to focus the lens group 301a on the flower of the subject.

The blurring effect (expressed by thick lines) is performed to the images W241 and W242 of FIGS. 35 and 36. When compared the image W241 with the image W242, the out-of-focus region (expressed by broken lines) is radially spread from the focus region (expressed by solid lines) in both the images W241 and W242. Similarly to the toy photo of the special effect processing, in the case in which the image shooting is performed while the lens group 301a is tilted from the initial state to focus the lens group 301a on the flower of the subject, when the image processing unit 2215a performs the diorama, the out-of-focus region and the focus region partially overlap each other, whereby the focus region blurs. Therefore, similarly to the toy photo, when the image processing unit 2215a performs the diorama as the special effect processing, the special effect changing unit 2215e changes the position in which the blurring processing is performed in the image according to the displacement amount of the lens group 301a (for example, see the image W242 of FIG. 36).

Figure 37:
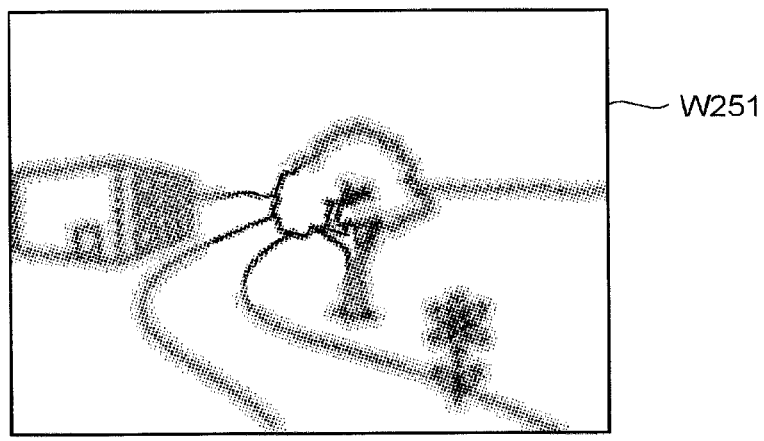
FIG. 37 is a view illustrating an example of an image in which the image processing unit performs fantastic focus while the image capturing apparatus of the fourth embodiment is provided with the lens unit.
Figure 38:
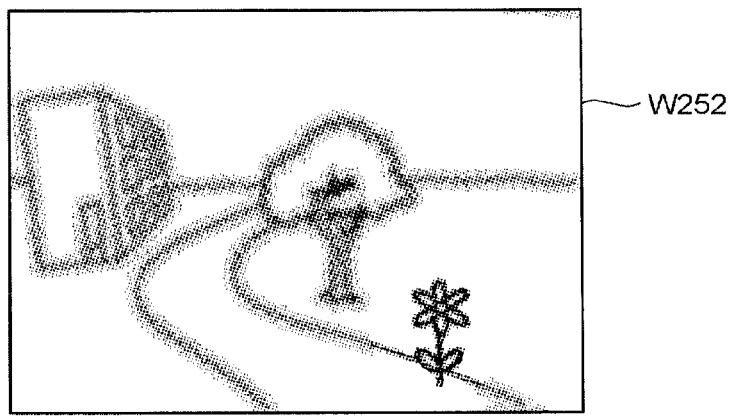
FIG. 38 is a view illustrating an example of the image in which the image processing unit performs fantastic focus while the image capturing apparatus of the fourth embodiment is provided with the lens unit.

FIGS. 37 and 38 are views illustrating an example of the image in which the image processing unit 2215a performs the fantastic focus as the special effect processing while the image capturing apparatus is provided with the lens unit 3. An image W251 of FIG. 37 is one in which the image processing unit 2215a performs the fantastic focus to the image data, which is captured using the lens group 301a in the initial state while the lens group 301a is focused on the center of the image. An image W252 of FIG. 38 is one in which the image processing unit 2215a performs the fantastic focus to the image data whose setting content is changed by the special effect changing unit 2215e to the image data, which is captured while the lens group 301a is tilted from the initial state to focus the lens group 301a on the flower of the subject.

The blurring effect (expressed by dilute, heavy lines) is performed to the images W251 and W252 of FIGS. 37 and 38. In the image W251 and the image W252, an outline of the subject becomes clear in the focus region (expressed by bold lines) compared with the region where the blurring effect is performed. In the case in which the image shooting is performed under a situation of FIG. 37 while the lens group 301a is tilted from the initial state to focus the lens group 301a on the flower of the subject, when the image processing unit 2215a performs the fantastic focus, a boundary between the focus region and the out-of-focus region becomes fuzzy. Therefore, when the image processing unit 2215a performs the fantastic focus as the special effect processing, the special effect changing unit 2215e changes the intensity of the blurring processing, which is evenly performed to the whole image, according to the displacement amount of the lens group 301a (for example, see the image W252 of FIG. 38). More specifically, intensity of the blurring processing is enhanced such that the originally-blurred region is further blurred.

Figure 39:
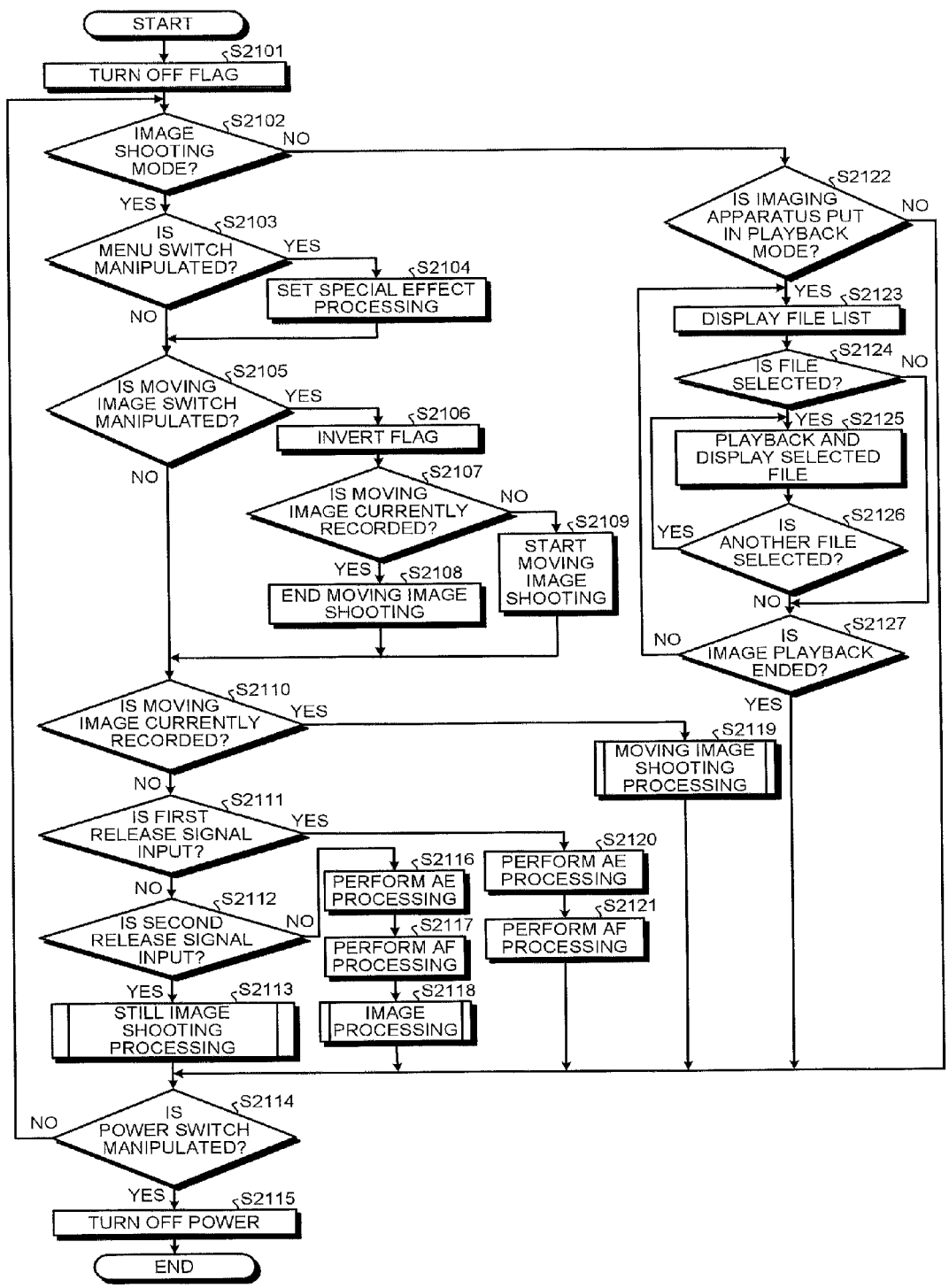
FIG. 39 is a flowchart illustrating an outline of processing performed by the image capturing apparatus of the fourth embodiment.

An operation performed by the image capturing apparatus 200 having the above configuration will be described below. FIG. 39 is a flowchart illustrating an outline of processing performed by the image capturing apparatus 200.

Referring to FIG. 39, the main body control unit 2215 turns off a flag indicating that the image capturing apparatus 200 currently performs moving image recording in association with the start-up of the image capturing apparatus 200 (Step S2101), and the main body control unit 2215 determines whether the image capturing apparatus 200 is put in the image shooting mode (Step S2102). When the image capturing apparatus 200 is put in the image shooting mode (Yes in Step S2102), the image capturing apparatus 200 goes to Step S2103. On the other hand, when the image capturing apparatus 200 is not put in the image shooting mode (No in Step S2102), the image capturing apparatus 200 goes to Step S2122 described below.

The case in which the image capturing apparatus 200 is put in the image shooting mode (Yes in Step S2102) will be described. When the menu switch 209e is manipulated (Yes in Step S2103), the special effect setting unit 2215d sets the processing that should be performed by the image processing unit 2215a in response to the instruction signal input from the menu switch 209e (Step S2104). The image processing unit 2215a performs the toy photo, the diorama, and the fantastic focus as the special effect processing by the setting. A recording format such as a JPEG recording method, a RAW recording method, an AVI recording method, a Motion-JPEG recording method, an H.264 (AVCHD) recording method, and an H.264 (MP4) recording method may be set.

When the menu switch 209e is not manipulated (No in Step S2103), the image capturing apparatus 200 goes to Step S2105.

When the moving image switch 209f is manipulated (Yes in Step S2105), the main body control unit 2215 inverts the flag (Step S2106).

When the image capturing apparatus 200 currently performs the moving image recording (Yes in Step S2107), the image capturing apparatus 200 ends the moving image shooting (Step S2108), and the image capturing apparatus 200 goes to Step S2110. On the other hand, when the image capturing apparatus 200 does not, currently perform the moving image recording (No in Step S2107), the image capturing apparatus 200 starts the moving image shooting (Step S2109), and the image capturing apparatus 200 goes to Step S2110.

When the moving image switch 209f is not manipulated (No in Step S2105), the image capturing apparatus 200 goes to Step S2110 described below.

When the image capturing apparatus 200 does not currently perform the moving image recording (No in Step S2110), when a first release signal is not input through the release switch 209b (No in Step S2111), and when a second release signal is input (Yes in Step S2112), the image capturing apparatus 200 performs still image shooting processing for capturing the still image (Step S2113), and the image capturing apparatus 200 goes to Step S2114 described below.

After Step S2113, when the power switch 209a is manipulated (Yes in Step S2114), the main body control unit 2215 performs the control to turn off the power supply (Step S2115), and the series of pieces of processing is ended.

After Step S2113, when the power switch 209a is not manipulated (No in Step S2114), the image capturing apparatus 200 returns to Step S2102.

When the image capturing apparatus 200 does not currently perform the moving image recording (No in Step S2111), when the first release signal is not input through the release switch 209b (No in Step S2111), and when the second release signal is not input (No in Step S2112), the main body control unit 2215 performs the AE processing for adjusting sensitivity (ISO) during the image shooting, the diaphragm, and the shutter speed based on the image data (Step S2116).

Then the main body control unit 2215 performs the AF processing for bringing the image capturing apparatus 200 into focus based on the image data (Step S2117), the image processing unit 2215a performs predetermined image processing to the image data (Step S2118), and the image capturing apparatus 200 goes to Step S2114. The detailed image processing is described later.

When the image capturing apparatus 200 does not currently perform the moving image recording (No in Step S2111), and when the first release signal is input through the release switch 209b (Yes in Step S2111), the main body control unit 2215 performs the AE processing based on the image data (Step S2120), and the main body control unit 2215 performs the AF processing based on the image data (step S2121). Then the image capturing apparatus 200 goes to Step S2114.

When the image capturing apparatus 200 currently performs the moving image recording (Yes in Step S2110), the image capturing apparatus 200 performs moving image shooting processing for capturing the moving image (Step S2119), and the image capturing apparatus 200 goes to Step S2114.

The case in which the image capturing apparatus 200 is not put in the image shooting mode (No in Step S2102) will be described below. When the image capturing apparatus 200 is put in the playback mode (Yes in Step S2122), the display control unit 2215g causes the display unit 210 to display a file list (Step S2123).

When a file that is displayed while enlarged is selected through the operation input unit 209 or the touch panel 211 (Yes in Step S2124), the display control unit 2215g causes the display unit 210 to perform the playback display of the selected file (Step S2125).

When another image file is newly selected (Yes in Step S2126), the image capturing apparatus 200 returns to Step S2125. On the other hand, when another image file is not selected (No in Step S2126), the image capturing apparatus 200 goes to Step S2127.

When the instruction to end the image playback is input through the operation input unit 209 or the touch panel 211 (Yes in Step S2127), the image capturing apparatus 200 goes to Step S2114. On the other hand, when the instruction to end the image playback is not input (No in Step S2127), the image capturing apparatus 200 returns to Step S2123.

When the file is not selected (No in Step S2124), the image capturing apparatus 200 goes to Step S2127.

When the image capturing apparatus 200 is not put in the playback mode (No in Step S2122), the image capturing apparatus 200 goes to Step S2114.

Figure 40:
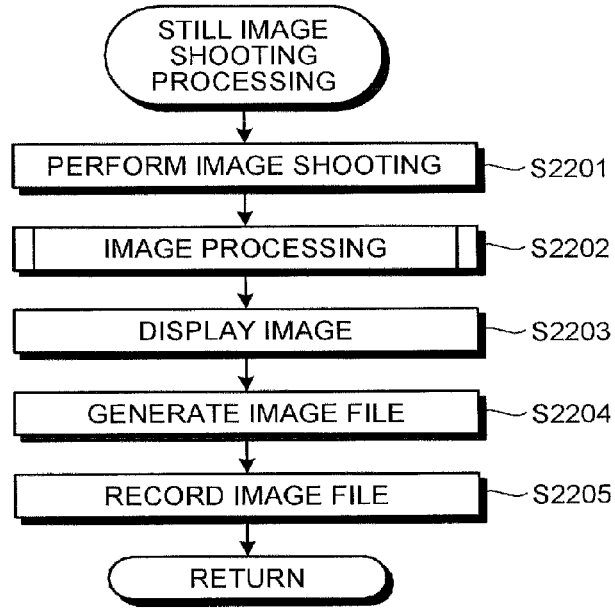
FIG. 40 is a flowchart illustrating an outline of still image shooting processing performed by the image capturing apparatus of the fourth embodiment.

Then still image shooting processing in Step S2113 of FIG. 39 will be described. FIG. 40 is a flowchart illustrating an outline of the still image shooting processing of FIG. 39.

As illustrated in FIG. 40, the image capturing apparatus 200 performs the image shooting under the control of the image shooting control unit 2215f (Step S2201).

The image processing unit 2215a performs predetermined image processing to the image data (RAW data), which is output from the image capturing unit 201 through the signal processing unit 203 by the image shooting (Step S2202). The detailed image processing is described later.

Then the display control unit 2215g causes the display unit 210 to display the image (Step S2203).

The main body control unit 2215 compresses the image data by the JPEG recording method while image shooting information during the image shooting and the image size are associated with the image data, and generates an image file in which the compressed image data is stored (Step S2204), the main body control unit 2215 records the generated image file in the storage unit 212 (Step S2205), and the image capturing apparatus 200 returns to the main routine of FIG. 39. As used herein the image shooting information means displacement information in which the optical axis of the optical system 301 is displaced from the reference position. When the image data is recorded in the storage unit 212 by the RAW recording method, a thumbnail image corresponding to the image data and RAW data to which the image processing unit 2215a performs the image processing are stored in the image file generated by the main body control unit 2215 and the image file may be recorded in the storage unit 212.

Figure 41:
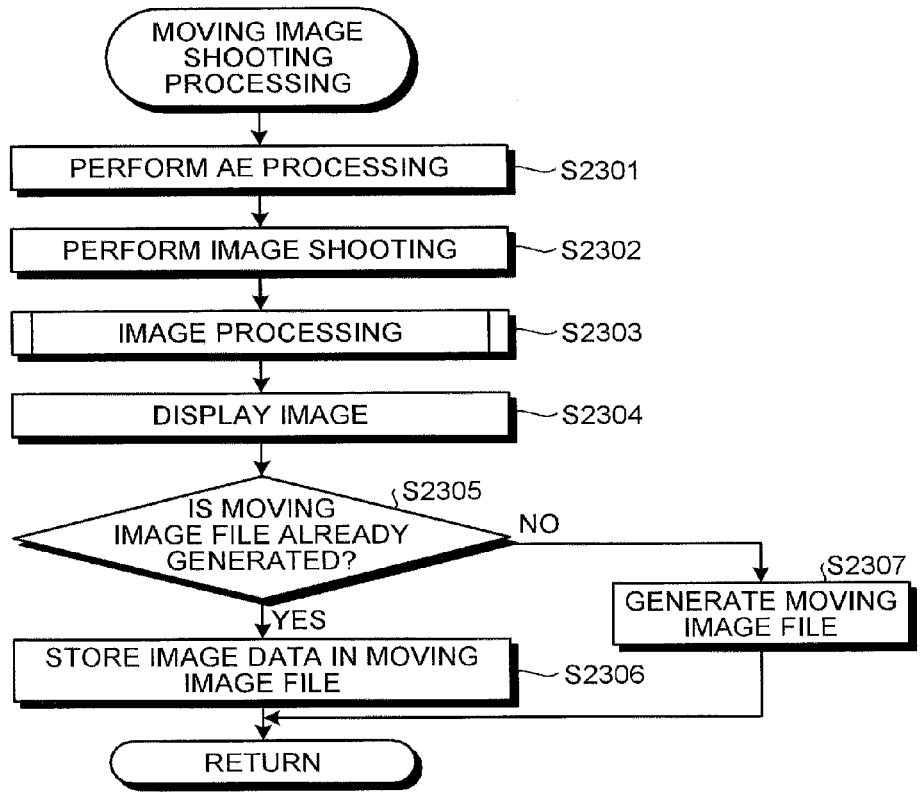
FIG. 41 is a flowchart illustrating an outline of moving image shooting processing performed by the image capturing apparatus of the fourth embodiment.

Then moving image shooting processing in Step S2119 of FIG. 39 will be described. FIG. 41 is a flowchart illustrating an outline of the moving image shooting processing of FIG. 39

As illustrated in FIG. 41, the image capturing apparatus 200 performs the AE processing for adjusting exposure (Step S2301). The image capturing apparatus 200 performs the image shooting under the control of the image shooting control unit 2215f (Step S2302).

The image processing unit 2215a performs predetermined image processing to the image data output from the image capturing unit 201 through the signal processing unit 203 (Step S2303). The detailed image processing is described later.

Then the display control unit 2215g causes the display unit 210 to display the image corresponding to the image data to which the image processing unit 2215a performs the image processing (Step S2304).

When the moving image file is already generated (Yes in Step S2305), the main body control unit 2215 stores the image data to which the image processing unit 2215a performs the image processing in the moving image file (Step S2306), and the image capturing apparatus 200 returns to the main routine of FIG. 39. On the other hand, when the moving image file is not generated yet (No in Step S2305), the main body control unit 2215 compresses the image data to which the image processing unit 2215a performs the image processing by the AVI recording method while the image shooting information during the image shooting and the image size are associated with the image data, and the main body control unit 2215 generates the moving image file in which the compressed image data is stored (Step S2307). Then the image capturing apparatus 200 returns to the main routine of FIG. 39.

Figure 42:
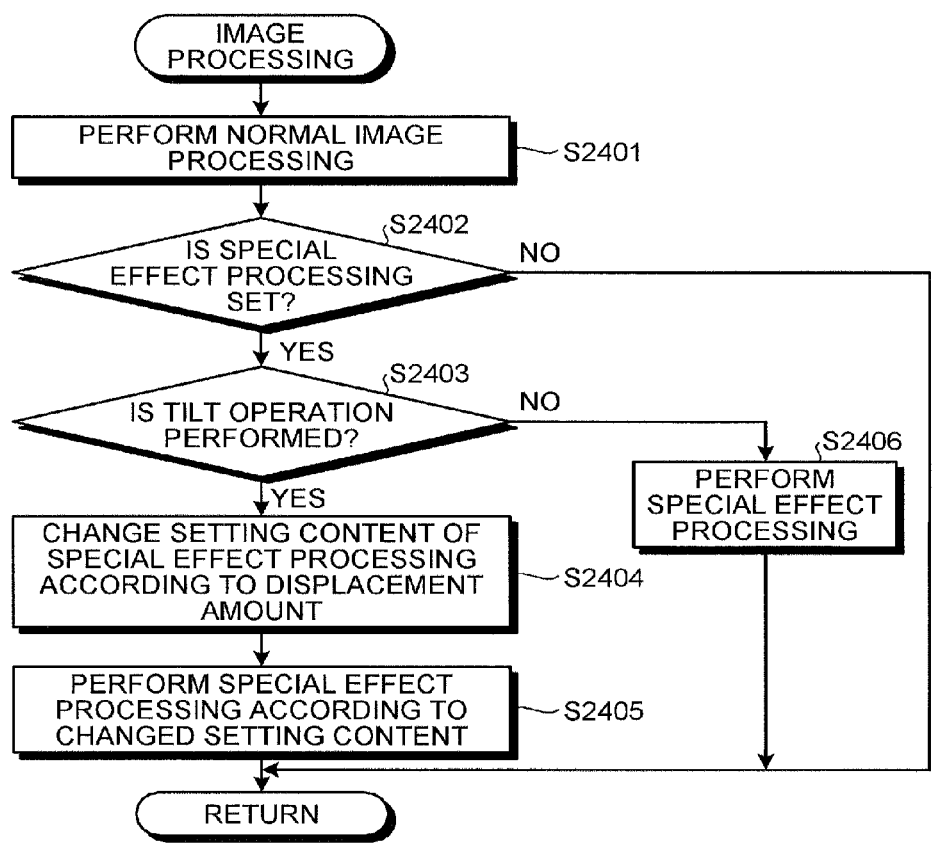
FIG. 42 is a flowchart illustrating an outline of image processing performed by the image capturing apparatus of the fourth embodiment.

The image processing in Step S2118 of FIG. 39, the image processing in Step S2202 of FIG. 40, and the image processing in Step S2303 will be described below. FIG. 42 is a flowchart illustrating an outline of the image processing of FIGS. 39, 40 and 41.

As illustrated in FIG. 42, the image processing unit 2215a performs normal pieces of image processing such as the white balance and the gamma correction to the image data (RAW data) (Step S2401).

The main body control unit 2215 determines whether the special effect processing that should be performed by the image processing unit 2215a is set (Step S2402). When the special effect processing that should be performed by the image processing unit 2215a is not set (No in Step S2402), the image capturing apparatus 200 returns to the main routine of FIG. 39, the still image shooting processing of FIG. 40, or the moving image shooting processing of FIG. 41. On the other hand, when the special effect processing that should be performed by the image processing unit 2215a is not set (Yes in Step S2402), the image capturing apparatus 200 goes to Step S2403.

In Step S2403, the state determination unit 2215c determines whether the tilt operation of the lens unit 3 is performed. Specifically, the state determination unit 2215c determines whether the tilt detecting unit 304 of the lens unit 3 detects the tilt of the optical system 301. When the tilt operation of the lens unit 3 is performed (Yes in Step S2403), the image capturing apparatus 200 goes to Step S2404. On the other hand, when the tilt operation of the lens unit 3 is not performed (No in Step S2403), the image capturing apparatus 200 goes to Step S2406.

The case in which the tilt operation of the lens unit 3 is performed (Yes in Step S2403) will be described. The special effect changing unit 2215e changes the setting content of the special effect processing, which is set by the special effect setting unit 2215d, according to the displacement amount of the optical axis of the optical system 301, which is detected by the tilt detecting unit 304 (Step S2404).

The image processing unit 2215a performs the special effect processing (for example, see FIGS. 34, 36, and 37) corresponding to the setting content changed by the special effect changing unit 2215e to the image data to which the normal image processing is performed (Step S2405). Then the image capturing apparatus 200 returns to the main routine of FIG. 39, the still image shooting processing of FIG. 40, or the moving image shooting processing of FIG. 41.

The case in which the tilt operation of the lens unit 3 is not performed (No in Step S2403) will be described. The image processing unit 2215a performs the special effect processing (for example, see FIGS. 33, 35, and 37) set by the special effect setting unit 2215d to the image data to which the normal image processing is performed (Step S2406). Then the image capturing apparatus 200 returns to the main routine of FIG. 39, the still image shooting processing of FIG. 40, or the moving image shooting processing of FIG. 41.

As described above, in the fourth embodiment of the invention, the special effect changing unit 2215e changes the setting content of the special effect processing, which is set by the special effect setting unit 2215d, according to the displacement amount detected by the tilt detecting unit 304. As a result, the special effect processing can properly be performed according to the state of the optical axis of the image shooting lens during the image shooting of the image data.

In the fourth embodiment of the invention, for the image data immediately after the image shooting, the setting content of the special effect processing is changed according to the displacement amount of the optical axis of the optical system 301, and the changed special effect processing is performed to the image data to which the normal image processing is already performed. Alternatively, for example, another external processing device such as a personal computer may perform the special effect processing to the image data with which the image shooting information during the image shooting is associated.

In the fourth embodiment of the invention, the special effect changing unit 2215e changes the setting content and the intensity in each position in the image as the special effect processing. Alternatively, for example, the shape or the region may be changed as the processing performed in the image.

In the fourth embodiment of the invention, it is not necessary to perform the color aberration correction to the image data when the image processing unit 2215a performs the special effect processing. Therefore, the image in which the lens characteristic is utilized can be generated.

In the fourth embodiment of the invention, when the image processing unit 2215a performs the special effect processing, the color aberration correction in which the color aberration included in the image data is enhanced may be performed by referring to the color aberration information on the lens unit 3 stored in the aberration information storage unit 308a. Therefore, the original image can be generated.

Other Embodiments

In the above embodiments, the display control unit changes the display appearance of the additional information added to the image displayed on the display unit according to the lens information on the lens group, which is output from the optical system. Alternatively, the display appearance of the additional information added to the image displayed on the display unit may be changed according to out-of-focus information spread toward the edge portion of the image. As used herein, the out-of-focus information means one of the out-of-focus amount that radially spread in the image (see FIG. 17), the out-of-focus direction that exudes into an ellipsoidal shape (see FIG. 18), the out-of-focus amount that forms into a water droplet (see FIGS. 17 and 18), and the contrast or edge of the image data.

In the above embodiments, the display control unit may display the additional information in the image displayed by the display unit when the tilt lens is attached to the main body.

In the above embodiments, the display control unit changes the display appearance of the additional information added to the image displayed on the display unit according to the lens information on the lens group, which is output from the optical system. Alternatively, the display appearance of the additional information added to the image displayed on the display unit may be changed according to the image shooting condition during the image shooting.

In the above embodiments, the image capturing apparatus is described as the digital single-lens reflex camera. Alternatively, for example, the invention can be applied to various pieces of electronic apparatus, such as a digital camera in which the lens unit and the main body unit are integrally formed, a digital video camera, and a camera-equipped mobile phone, which include the image shooting function and the display function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus comprising:
an optical system that includes a lens group including at least one lens, an optical axis of the optical system being able to be displaced;
an image capturing unit that receives light collected by the optical system and generates electronic image data;
a detecting unit for detecting a positional relationship between the optical axis and a light receiving surface of the image capturing unit;
a display unit that displays an image corresponding to the image data; and
a display control unit that changes a display appearance of additional information, which is added to the image, according to the detected positional relationship between the optical axis and a light receiving surface of the image capturing unit.

2. An image capturing method performed by an image capturing apparatus including an optical system that includes a lens group including at least one lens and an image capturing unit that receives light collected by the optical system and generates electronic image data, the image capturing apparatus being able to displace an optical axis of the optical system, the image capturing method comprising:
detecting a positional relationship between the optical axis and a light receiving surface of the image capturing unit;
displaying an image corresponding to the image data; and
changing a display appearance of additional information, which is added to the image, according to the detected positional relationship between the optical axis and a light receiving surface of the image capturing unit.

3. A non-transitory computer-readable storage medium with an executable program stored thereon, a processor being included in an image capturing apparatus including an optical system that includes a lens group including at least one lens and an image capturing unit that receives light collected by the optical system and generates electronic image data, the image capturing apparatus being able to displace an optical axis of the optical system, wherein the program instructs the processor to perform:
detecting a positional relationship between the optical axis and a light receiving surface of the image capturing unit;
displaying an image corresponding to the image data; and
changing a display appearance of additional information, which is added to the image, according to the detected positional relationship between the optical axis and a light receiving surface of the image capturing unit.

4. An image capturing apparatus comprising:
an optical system that includes a lens group including at least one lens, an optical axis of the optical system being able to be displaced;
an image capturing unit that receives light collected by the optical system and generates electronic image data;
a display unit that displays an image corresponding to the image data; and
a display control unit that changes a display appearance of additional information, which is added to the image, according to a positional relationship between the optical axis and a light receiving surface of the image capturing unit,
wherein the display control unit changes the display appearance of the additional information according to lens information on a lens state of the lens group, which is output from the optical system, and out-of-focus information that is spread toward a peripheral edge portion of the image.

5. The image capturing apparatus according to claim 1, wherein the display control unit changes the display appearance of the additional information according to lens information on a lens state of the lens group, which is output from the optical system, and out-of-focus information that is spread toward a peripheral edge portion of the image.

6. The image capturing apparatus according to claim 4, further comprising a displacement amount detecting unit that detects a displacement amount from a reference position, in which the optical axis is orthogonal to the light receiving surface of the image capturing unit,
wherein the display control unit causes the display unit to display a focus region of the optical system and/or an out-of-focus region of the optical system in a region of the image as the additional information according to the displacement amount detected by the displacement amount detecting unit.

7. The image capturing apparatus according to claim 6, further comprising:
a focus adjustment unit that adjust focus of the optical system;
a position detecting unit that detects a focus position adjusted by the focus adjustment unit;
a state determination unit that determines a state of the optical system according to the focus position detected by the position detecting unit; and
an image shooting control unit that performs control to start an image shooting operation in the image capturing apparatus when the focus position is in a state in which the focus position is fixed for a predetermined time as a determination result of the state determination unit.

8. The image capturing apparatus according to claim 7, wherein the display control unit causes the display unit to display a rectangular frame corresponding to the focus region while the focus region is superposed on the image.

9. The image capturing apparatus according to claim 8, wherein the optical system is detachably attached to a main body of the image capturing apparatus.

10. The image capturing apparatus according to claim 4, further comprising:
a displacement amount detecting unit that detects a displacement amount from a reference position, in which the optical axis is orthogonal to the light receiving surface of the image capturing unit; and
a focusing candidate region decision unit that decides a candidate region where focusing control is performed by the image capturing unit on the basis of a detection result of the displacement amount detecting unit,
wherein the display control unit causes the display unit to display a region corresponding to the candidate region decided by the focusing candidate region decision unit as the additional information along with the image.

11. The image capturing apparatus according to claim 10, wherein the display control unit causes the display unit to display displacement limit warning information informing a user that the displacement amount reaches a displacement limit when the displacement amount detected by the displacement amount detecting unit reaches a limit.

12. The image capturing apparatus according to claim 11, wherein the display control unit causes the display unit to display closest focusing distance limit warning information informing the user that a focusing position is closer than a closest focusing distance when a distance from the optical system to the focusing position is smaller than the closest focusing distance that is decided according to the displacement amount of the optical axis of the optical system.

13. The image capturing apparatus according to claim 12, further comprising:
a fill light illuminating unit that illuminates a visual field region of the image capturing apparatus with fill light; and
a light control unit that adjusts an illumination amount of the fill light illuminating unit according to the displacement amount of the optical axis of the optical system and a distance from the optical system to the focusing position.

14. The image capturing apparatus according to claim 13, wherein the optical system is detachably attached to a main body of the image capturing apparatus.

15. The image capturing apparatus according to claim 4, further comprising:
a displacement amount detecting unit that detects a displacement amount from a reference position, in which the optical axis is orthogonal to the light receiving surface of the image capturing unit;
an image processing unit that performs special effect processing to the image data in order to generate a visual effect by a combination of a plurality of pieces of image processing;
an operation input unit that receives an input of an instruction signal instructing a content of the special effect processing performed by the image processing unit;
a special effect setting unit that sets processing, which is to be performed by the image processing unit, according to the instruction signal input from the operation input unit; and
a special effect changing unit that refers to the displacement amount to change the content of the special effect processing set by the special effect setting unit.

16. The image processing apparatus according to claim 15, wherein the displacement amount is a tilt angle at which the optical axis of the optical system is tilted from the reference position.

17. The image capturing apparatus according to claim 16, wherein different pieces of image processing are performed according to a position in the image corresponding to the image data in the special effect processing, and
the special effect changing unit changes the content of the image processing in each position for the special effect processing.

18. The image capturing apparatus according to claim 17, wherein the special effect processing is shading processing for performing a shading effect to a periphery of the image.

19. The image capturing apparatus according to claim 17, wherein the special effect processing is blurring processing for performing a blurring effect to a periphery of the image.

20. The image capturing apparatus according to claim 17, wherein the special effect processing is evenly performed to the whole image corresponding to the image data, and
the special effect changing unit changes intensity of the special effect processing.

21. The image processing apparatus according to claim 20, wherein the special effect processing is blurring processing for performing a blurring effect to the whole image.

* * * * *